United States Patent [19]
Fuchs et al.

[11] Patent Number: 5,530,802
[45] Date of Patent: Jun. 25, 1996

[54] INPUT SEQUENCE REORDERING METHOD FOR SOFTWARE FAILURE RECOVERY

[75] Inventors: Wesley K. Fuchs, Mahomet, Ill.; Yennun Huang, Bridgewater; Yi-Min Wang, Berkeley Heights, both of N.J.

[73] Assignee: AT&T Corp., Murray Hill, N.J.

[21] Appl. No.: 264,027

[22] Filed: Jun. 22, 1994

[51] Int. Cl.$^6$ .................................................. G06F 11/00
[52] U.S. Cl. .............................. 395/182.15; 395/183.1; 364/285.2; 364/DIG. 1
[58] Field of Search ..................... 371/12, 19; 395/575, 395/181, 182.13, 182.14, 182.15, 182.18, 183.1, 182.02; 364/266, 266.5, 281.8, 282.2, 285.2

[56] References Cited

U.S. PATENT DOCUMENTS

| | | | |
|---|---|---|---|
| 4,665,520 | 5/1987 | Strom et al. | 364/200 |
| 4,868,744 | 9/1989 | Reinsch et al. | 364/12 |
| 4,878,167 | 10/1989 | Kapulka et al. | 364/200 |
| 4,941,087 | 7/1990 | Kap | 364/200 |

OTHER PUBLICATIONS

Liebchen "Dynamic reordering of High Lantenca Transactions Using a Modified Micropipeline" IEEE pp. 336–340.

Wang et al "Optimistic Message Logging for Independent Checkpointing in Message–Passing Systems" IEEE 1992 pp. 147–154.

Wang et al. "Scheduling Message Processing for Reducing Rollback Propagation" IEEE 1992. pp. 204–211.

Bianchini, R., Jr., Ruskens, R., "An Adaptive Distributed System–Level Diagnosis Algorithm and Its Implementation," Proc. of 21st IEEE Conf. on Fault Tolerant Computing Systems (FTCS), pp. 222–229, Jul. 1991.

Huang, Y., Kintala, C., "Software Implemented Fault Tolerance: Technologies and experience," Proc. of 23d IEEE Conf. on Fault Tolerant Computing Systems CFTCS, pp. 2–9, Jun. 22, 1993.

Koo, R., Toueg, S., "Checkpointing and Rollback–Recovery for Distributed Systems," IEEE Trans. Software Eng., vol. SE–13, No. 1, pp. 23–31, Jan. 1987.

Wang, Y.–M., Fuchs, W. K., "Lazy Checkpoint Coordination for Bounding Rollback Propagation," Proc. IEEE Symposium Reliable Distributed Systems, pp. 78–85, Oct. 1993.

Wang, Y.–M., et al., "Progressive Retry for Software Error Recovery in Distributed Systems," Proc. of 23d IEEE Conf. on Fault–Tolerant Computing Systems (FTCS), pp. 138–144, Jun. 22, 1993.

22 slides presented at the Computer System Technical Meeting, May 20, 1993, Copy of agenda attached.

*Primary Examiner*—Robert W. Beausoliel, Jr.
*Assistant Examiner*—Albert Decady

[57] ABSTRACT

A software failure bypass system based on checkpointing, input logging, rollback and input sequence reordering is disclosed. The software fault bypass system minimizes the number of involved processes as well as the total rollback distance. The software fault bypass system includes a progressive retry recovery algorithm which gradually increases the scope of the recovery when a previous retry step fails to bypass the detected fault and a reorder recovery algorithm which will attempt to bypass the detected fault by reordering and reprocessing the inputs that have been received by the faulty application process. The fault tolerant system includes a mechanism which utilizes information about the particular application process or the cause of the detected fault to determine if the recovery of a particular application process should proceed directly to the reorder recovery algorithm. In one embodiment, if the faulty process exhibits nondeterministic behavior, the overall progressive retry recovery algorithm should be utilized to recover the faulty process. If the faulty process does not exhibit nondeterministic behavior, however, the reorder recovery algorithm should be utilized to recover the faulty process.

11 Claims, 17 Drawing Sheets

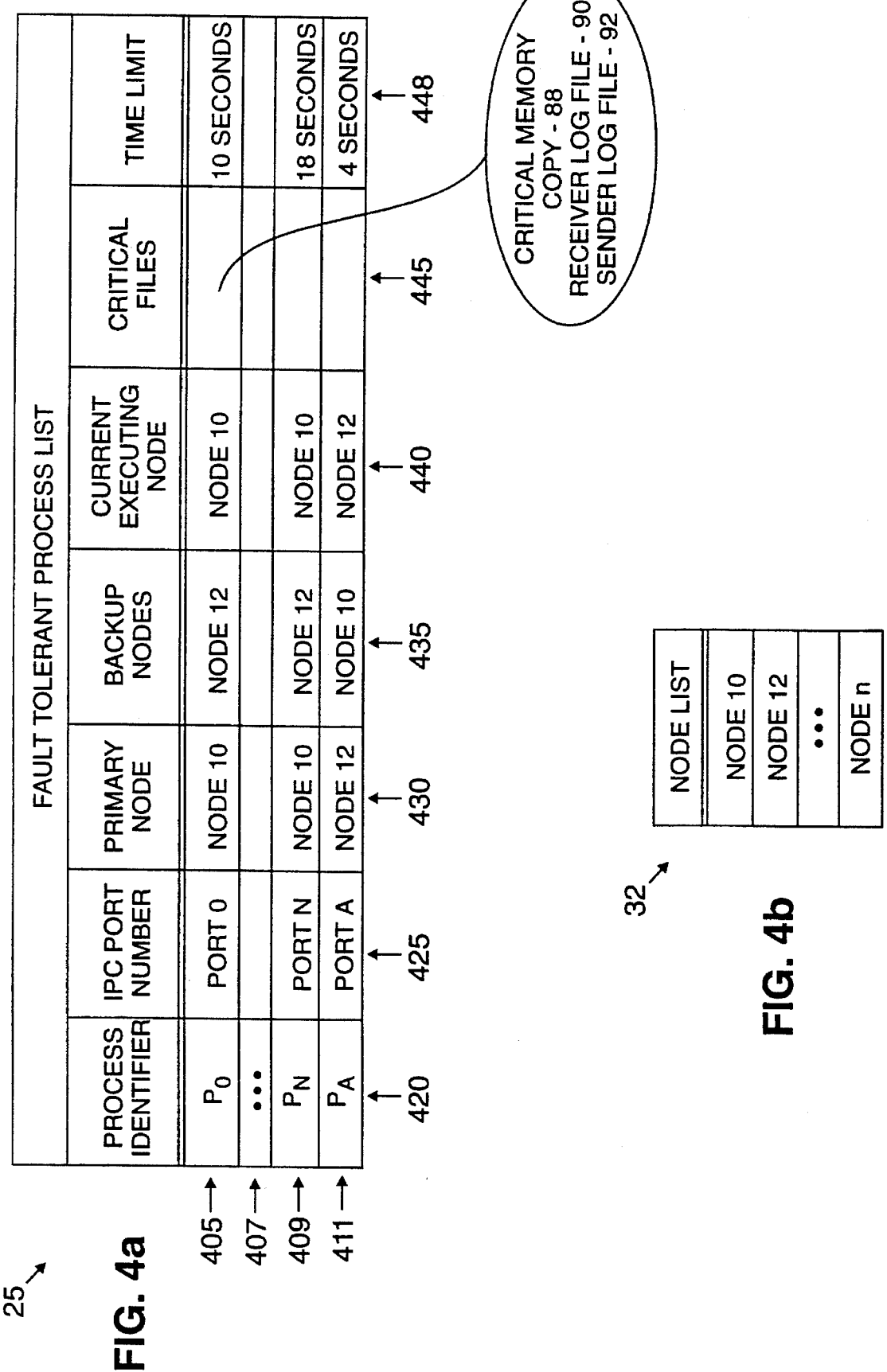

FIG. 5a

RECEIVER MESSAGE LOG - $P_2$

| MESSAGE ID | MESSAGE SIZE | MESSAGE CONTENT | SENDER'S PROCESS ID | SENDER'S CHECKPOINT INTERVAL | SENDER'S LOGICAL CHECKPOINT | REFERENCE ID |
|---|---|---|---|---|---|---|
| $M_a$ | 2 BYTES | OPEN FILE 1 | $P_3$ | CHECKPOINT D | $L_{3,1}$ | 0 |
| $M_b$ | 4 BYTES | WRITE FILE 1 | $P_1$ | CHECKPOINT B | $L_{1,1}$ | 0 |
| $M_c$ | 1 BYTE | CLOSE FILE 1 | $P_1$ | CHECKPOINT B | $L_{1,4}$ | 0 |

FIG. 5b

SENDER MESSAGE LOG - $P_2$

| MESSAGE ID | MESSAGE SIZE | MESSAGE CONTENT | RECEIVER'S PROCESS ID | SENDER'S LOGICAL CHECKPOINT |
|---|---|---|---|---|
| $M_1$ | 4 BYTES | | $P_3$ | CHECKPOINT C |
| $M_2$ | 3 BYTES | | $P_1$ | CHECKPOINT C |
| $M_g$ | 3 BYTES | | $P_1$ | $L_{2,2}$ |
| $M_f$ | 2 BYTES | | $P_1$ | $L_{2,2}$ |

STEP 1 RETRY

STEP 1 RETRY WITH NONDETERMINISTIC EVENT

STEP 3 RETRY WITH NONDETERMINISTIC EVENT

STEP 4 RETRY

INPUT SEQUENCE REORDERING METHOD FOR SOFTWARE FAILURE RECOVERY

This invention received partial support from the Government under Contract Nos. NAG 1-613 of the National Aeronautics and Space Administration and N00014-91-J-1283 of the Office of Naval Research. As a result, the Government has certain rights in this invention.

CROSS REFERENCE TO RELATED APPLICATIONS

The present invention is related to the following contemporaneously filed U.S. patent application: "Progressive Retry Method and Apparatus for Software Failure Recovery in Multi-Process Message-Passing Applications," Ser. No. 08/263,978 and "Progressive Retry Method and Apparatus Having Reusable Software Modules for Software Failure Recovery in Multi-Process Message-Passing Applications," U.S. Pat. No. 08/263,916, each assigned to the assignee of the present invention. The disclosures of these related applications are incorporated herein by reference.

FIELD OF THE INVENTION

The present invention relates to a system for bypassing software faults in message-passing applications, and more particularly, to a method and apparatus for bypassing software faults based on a reorder retry method which following a detected fault will reorder the sequence of inputs which have been processed by an application process.

BACKGROUND OF THE INVENTION

Increasingly, the users of software applications are demanding that the software be tolerant to faults. In particular, users are concerned with two components of fault tolerance: availability and data consistency of the application. For example, users of telecommunication switching systems demand that the switching systems are continuously available. For transmissions involving financial transactions, however, such as for bank teller machines, customers also demand the highest degree of data consistency.

Due to the complex and temporal nature of interleaving messages and computations in a distributed system executing a plurality of concurrent processes, however, no amount of verification, validation and testing during software debugging will detect and eliminate all software faults and give complete confidence in the availability and data consistency of that application. Accordingly, residual faults due to untested boundary conditions, unanticipated exceptions and unexpected execution environments have been observed to escape the testing and debugging process and, when triggered during program execution, will manifest themselves and cause the application process to crash or hang, thereby causing service interruption.

It is therefore desirable to have effective on-line retry mechanisms for automatically detecting and bypassing such software faults, in order to allow recovery from the software failures. Several studies have shown that many software failures in production systems behave in a transient fashion. Accordingly, the easiest way to recover from such failures is to restart the application process and thereby execute the same process under different conditions, an approach often referred to as environment diversity. However, restarting a system often involves a comprehensive initialization procedure and thus may require a potentially considerable service disruption.

Thus, in order to minimize the amount of time lost in restarting a system, numerous checkpointing and rollback recovery techniques have been proposed to recover more efficiently from transient hardware failures. For a general discussion of checkpointing and rollback recovery techniques, see R. Koo and S. Toueg, "Checkpointing and Rollback-Recovery for Distributed Systems," IEEE Trans. Software Eng., Vol. SE-13, No. 1, pp. 23–31 (January 1987). Generally, a checkpoint is a periodic backup copy of the data associated with an application process, which allows the application process to be restarted from the checkpoint which has been stored in a backup memory device.

Few, if any, checkpointing and rollback recovery techniques, however, have been proposed to recover from transient software failures. It is submitted that the rollback techniques previously developed for transient hardware failure recovery can also be used to recover from software errors by exploiting message replay and message reordering to bypass software faults.

As is apparent from the above discussion, a need exists for a reorder recovery system for bypassing transient software faults which minimizes the scope of the roll back, including the number of processes involved in the roll back and the total roll back distance, in order to achieve faster recovery. A further need exists for a recovery system that bypasses a detected software fault by reordering the sequence of inputs to be processed by an application process.

SUMMARY OF THE INVENTION

Generally, according to one aspect of the invention, a fault tolerant computing system is provided to monitor one or more application processes which may communicate by means of a message passing mechanism. The fault tolerant computing system will detect faults in an application process which cause the application process to crash or hang. Thereafter, the fault tolerant computing system will initiate a recovery of the faulty application process, utilizing a progressive retry recovery algorithm which gradually increases the scope of the recovery when a previous retry step fails to bypass the detected fault or a reorder recovery algorithm which will reorder and reprocess the inputs that have been received by the faulty application process.

In one embodiment, the fault tolerant computing system will periodically perform a checkpoint of data associated with the monitored application processes. In addition, inputs that are received by a monitored application process are logged in an input log associated with the process. Preferably, the input log stores the input contents and processing order information for each logged input.

The logging of inputs received by each application process in the input log effectively places a "logical" checkpoint at the end of the ensuing state interval, which serves to minimize the domino effect of rollback propagation which would tend to include other processes in the recovery in a multiple process environment.

According to a further feature of the invention, a roll back propagation algorithm is provided in a multiple process environment which minimizes the scope of the recovery by computing the recovery line at the latest consistent actual or logical checkpoint for each of said monitored processes which has not been discarded. The roll back propagation algorithm enforces the roll back propagation rule which requires that if a process which previously sent an output message rolls back and now unsends the message, the process which received the message as an input must also roll back to unreceive the input.

According to another feature of the invention, inputs in the input logs are classified during a recovery mode in the following manner: inputs that were received and processed by the associated process between its latest actual checkpoint and the computed recovery line are classified as deterministic inputs and inputs in the input logs that were sent before the computed recovery line and received after the recovery line are classified as intransit inputs. All other inputs in the input log are discarded during a recovery mode.

According to yet another feature of the invention, a progressive retry algorithm embodying principles of the present invention may be executed following detection of a fault in an application process in order to attempt to recover the faulty process. The progressive retry algorithm minimizes the scope of the recovery, including the number of processes involved in the recovery and the total roll back distance. The progressive retry algorithm will proceed to a subsequent step only when the previous step has failed to bypass the detected fault.

According to a further feature of the invention, a mechanism is provided for determining if the recovery of a particular application process should proceed directly to the reordering recovery steps of the progressive retry algorithm. In one embodiment, a reorder recovery algorithm is provided that consists only of the receiver reorder step of the overall progressive retry algorithm. When information is known about the particular application process or the cause of the detected fault, it may be determined that the reorder recovery algorithm may be more appropriate for bypassing the fault. For example, the reorder recovery algorithm is particularly suitable for bypassing faults where the application process exhibits deterministic behavior, or where the detected fault results from the occurrence of a boundary condition or a racing condition.

In one embodiment, a function is provided, which when invoked by an application process, sets a flag indicating that the process has exhibited nondeterministic behavior. When an error is detected for an application process, and the nondeterministic flag has been previously set by the application process, the recovery should initiate the overall progressive retry recovery algorithm.

The progressive retry algorithm comprises the following steps: receiver replay, receiver reorder, sender replay, sender reorder and large scope roll back to a globally consistent checkpoint. The receiver replay step will preferably restore the faulty process to its latest checkpoint and then replay the inputs in the input log associated with the faulty process that were received by the faulty process since the latest checkpoint up to the point of the detected fault.

The receiver reorder step will preferably discard the processing order information for the inputs in the input log associated with the faulty process that were received after its latest checkpoint, initiate a recomputation of the recovery line, reorder the in-transit inputs in the input log of the faulty process and then replay the deterministic inputs and replay or resubmit in-transit inputs in the input logs of each of the monitored processes whose current process state is not at the recovery line.

The sender replay step will preferably discard the inputs in the input log associated with the faulty process that were received by the faulty process after the last checkpoint performed for the faulty process and then replay the deterministic and in-transit inputs in the input logs of each of the monitored processes whose current process state is not at the recovery line, with each of the sending processes that sent the discarded inputs to the faulty process during initial processing resending inputs to the faulty process during the sender replay step.

The sender reorder step will preferably discard the processing order information for each of those received inputs in the input logs associated with the sending processes that were received by the sending process after the logical checkpoint which is before the first input sent by the sending process to the faulty process since the latest checkpoint associated with the faulty process, initiate a recomputation of the recovery line, reorder the in-transit inputs in the input logs associated with the sending processes; and then replay the deterministic and in-transit inputs in the input logs of each of the monitored processes whose current process state is not at the recomputed recovery line.

Finally, if the previous localized recovery attempts are unsuccessful, the large scope roll back step will roll back each of the monitored processes to the latest globally consistent checkpoint.

According to a further feature of the invention, a method is provided for bypassing faults in an application process comprising the steps of: monitoring the application process for a software fault; periodically performing a checkpoint of critical data associated with the application process; logging inputs that are received and processed by the application process in an input log including an indication of the processing order in which the inputs were processed by the application process; restoring the application process to the latest checkpoint upon detection of an error during the monitoring step; reordering the sequence of the inputs that were logged in the input log since the latest checkpoint; and reprocessing the reordered inputs.

A more complete understanding of the present invention, as well as further features and advantages of the invention, will be obtained by reference to the detailed description and drawings.

BRIEF DESCRIPTION OF THE DRAWINGS

FIG. 4a illustrates a fault tolerant process list that maintains current information for each monitored application process that is executing in the fault tolerant computing system of FIG. 1;

FIG. 4b illustrates a node list that maintains a list of each of the processing nodes that are currently active in a multiple node environment of the fault tolerant computing system of FIG. 1;

FIGS. 5a and 5b illustrate a receiver and a sender log file, respectively, that maintain information on each of the messages that are received or sent, respectively, by an associated application process;

DETAILED DESCRIPTION

Figure 1:
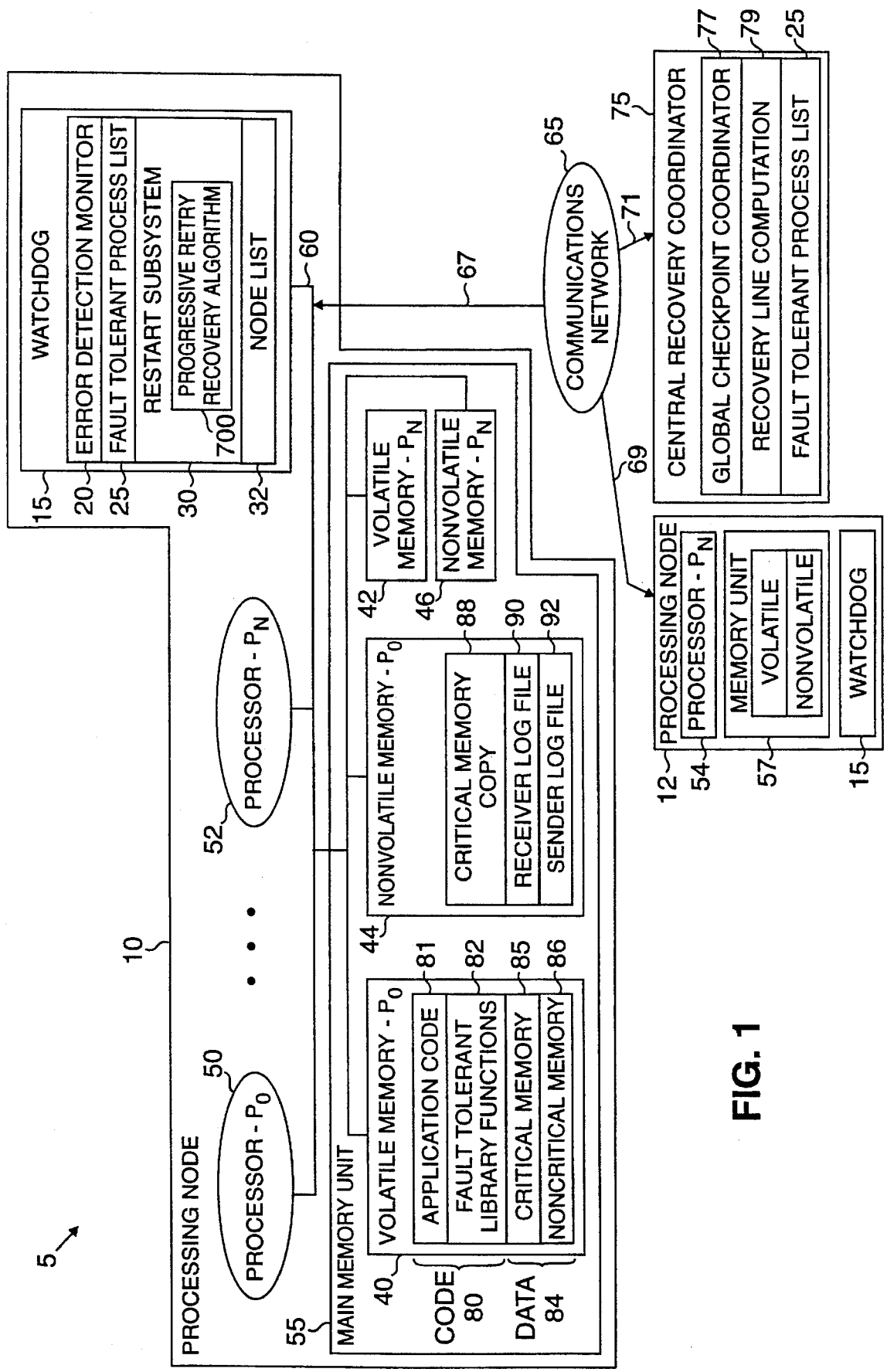
FIG. 1 is a schematic block diagram illustrating a fault tolerant computing system according to the present invention.

A fault tolerant computing system 5 according to the present invention is shown in FIG. 1. As discussed further below, the fault tolerant computing system 5 provides facilities for monitoring one or more application processes which may communicate by means of a message passing mechanism. The fault tolerant computing system 5 will detect faults in an application process which cause the application process to crash or hang. Thereafter, the fault tolerant computing system 5 will initiate a recovery of the application process. According to one feature of the invention, a progressive retry recovery algorithm is utilized which gradually increases the scope of the recovery when a previous retry step fails.

The fault tolerant computing system 5 may be implemented in an environment consisting of a single node executing one or more processes, or, alternatively, in an environment consisting of a plurality of interconnected nodes each executing one or more processes, as shown in FIG. 1. It is noted that the natural redundancy of a multiple node environment provides an enhanced mechanism for detecting and recovering from hardware or operating system failures of a given node, as discussed further below in a section entitled MULTIPLE NODE OPERATION. Thus, if a fault-tolerant process on one node can be restarted on another node, in the manner described below, the process will tolerate hardware and operating system faults on the first node.

SYSTEM ARCHITECTURE

As shown in FIG. 1, a preferred embodiment of the fault tolerant computing system 5 disclosed herein includes a plurality of processing nodes, such as the nodes 10 and 12. Alternatively, the fault tolerant computing system 5 may consist of a single node having a single processing unit that is capable of executing a plurality of concurrent processes by implementing a time sharing mechanism, in a known manner.

Each node, such as the nodes 10 and 12, may be embodied as a workstation or other general-purpose computing device which consists of at least one processing unit, such as the processing units 50, 52 and 54, and a memory unit, such as the memory units 55 and 57. Alternatively, one or more of the processing nodes, such as the nodes 10 and 12, may be embodied as a dedicated program controlled processor, such as a telecommunications switch.

In one embodiment,-one or more nodes in the fault, tolerant computing system 5, such as the node 10, are embodied as parallel processing units, such as a parallel processing workstation, capable of executing a plurality of concurrent processes. Each processing unit 50, 52, 54 executes a concurrent process, such as the processes $P_0$ through $P_N$ and $P_A$.

If a node, such as the node 10, includes a plurality of processors, such as processors 50 and 52, each processor can have its own dedicated memory unit, or can share a common memory unit 55 with other processors in the same node 10, as shown in FIG. 1. The memory unit 55 of each node, such as the nodes 10 and 12, typically includes areas of volatile memory 40, 42 and nonvolatile memory 44, 46. In a preferred embodiment, each process will have separately allocated areas of volatile and nonvolatile memory in the memory unit 55, such as memory areas 40 and 44 for the process $P_0$, as shown in FIG. 1. As is well-known, volatile memory is an area of unstable memory that is unable to retain information without continuous power.

The volatile memory area 40 associated with each process will preferably include a section 80 for storing the software code associated with the respective application process. The code section 80 associated with a given application process will typically include application code 81 and fault tolerant library functions 82 invoked by the application code. The fault tolerant library functions 82, discussed below in a section entitled FAULT TOLERANT LIBRARY FUNCTIONS, are user-level library functions written in a high level programming language, such as the C programming language. The fault tolerant library functions 82 can be used in an application process to implement fault tolerance in the process according to the one feature of the present invention. In a preferred embodiment, the application code which invokes routines from the fault tolerant library 82 will be bound together with the invoked functions during compilation.

In addition, the volatile memory area 40 associated with each process will include a data section 84 for storing the data associated with the respective application process. In a preferred embodiment, discussed below, the fault tolerant library 82 includes a critical memory function which allows a user to specify that certain data associated with an application process is critical data, which will be preferably stored by the fault tolerant computing system 5 in an area of critical memory 85. Data in the application process that is not specified by the user to be critical data will be stored in an area of noncritical memory 86.

According to one feature of the invention, discussed further below, the fault tolerant library 82 includes a checkpoint function, which, when invoked by an application process, will store a copy of the critical data 85, as specified by the user, from the volatile memory 40 in an area 88 of nonvolatile memory 44, which is a stable storage device which can retain information even in the absence of power. The nonvolatile memory 44 may be a portion of the memory unit 55, or a remote file system. In a multiple node environment, the critical memory copy 88 will preferably be saved on backup nodes in addition to the primary node, as discussed below.

According to a further feature of the invention, a message log is maintained by the fault tolerant computing system 5 for storing information on messages that are sent and received by each process, such as a copy of the contents of each message and information on the order in which each message was processed by the application process. In a preferred embodiment, a receiver log file 90 and a sender log file 92, discussed below in conjunction with FIGS. 5a and 5b, respectively, are separately maintained for each process for storing information on messages that are received and sent by the associated process, respectively.

In a preferred embodiment, upon each successful globally consistent checkpoint, the central recovery coordinator 75 will broadcast a message to all processes requesting each process to open a new receiver and sender log file 90, 92. In this manner, the current receiver and sender log files 90, 92 for each application process will store information only on the messages received by the associated application process since the latest globally consistent checkpoint.

Accordingly, as discussed further below, upon detection of a fault in an application process, a log-based recovery may be implemented using the present invention by restarting the faulty process from the latest checkpoint stored in the critical memory copy 88 and then replaying messages from the message logs 90, 92, that were sent or received since the latest checkpoint to reconstruct the process state up to the point where the fault was detected.

The processing units 50, 52 and memory unit 55 of an individual node, such as the node 10, are interconnected by a bus 60, or Inter Process Communication (IPC) facilities on the local node for intra-node communication, in a known manner. In addition, each node 10, 12 may be interconnected with other nodes and a central recovery coordinator 75, discussed below, via communications network 65 and data links 67–71, in a known manner, for inter-node communication.

As shown in FIG. 1, each node, such as the node 10, will have a watchdog 15 which includes an error detection monitor 20 for monitoring processes that are executing on the respective node. The watchdog 15 will maintain a fault tolerant process list 25, discussed further below in conjunction with FIG. 4a, which lists those processes executing on the respective node 10 which should be monitored by the watchdog 15.

The error detection monitor 20 of the watchdog 15 will continuously monitor each application process listed in the fault tolerant process list 25, such as process $P_0$, to determine whether the process is hung or has crashed. The monitoring performed by the error detection monitor 20 may be either active or passive. In an active monitoring arrangement, the watchdog 15 may poll each monitored application process to determine its condition by periodically sending a message to the process using the Inter Process Communication (IPC) facilities on the local node 10 and evaluating the return value to determine whether that process is still active.

In a passive monitoring arrangement, each application process includes a function from the fault tolerant library 82, discussed below, which will send a heartbeat message at specified intervals to the watchdog 15, indicating that the associated process is still active. If the watchdog 15 does not receive another signal from the application process before the end of the specified interval, the watchdog 15 will presume that the application process is hung or has crashed.

The watchdog 15 also includes a restart subsystem 30 for executing the progressive retry recovery algorithm 700 according to the present invention, discussed below in conjunction with FIGS. 7 through 14. As discussed further below, upon detection of a fault in an application process by the error detection monitor 20, the restart subsystem 30 will attempt to recover the faulty application process by initiating a restart of the faulty application process, in the manner described below, at its latest checkpoint, and then reprocessing the messages logged in the receiver and sender log files 90, 92 since the latest checkpoint to bring the faulty application process up to the state at which the crash was detected.

According to one feature of the invention, the progressive retry recovery algorithm 700, which utilizes checkpointing, rollback, message replaying and message reordering, minimizes the number of processes involved in a recovery, as well as the total rollback distance. As discussed below in conjunction with FIGS. 7 through 14, the progressive retry recovery algorithm 700 consists of a number of retry steps which gradually increase the scope of the rollback when a previous retry step fails.

In a preferred embodiment, a central recovery coordinator 75 is utilized to maintain a set of globally consistent checkpoints, to minimize the scope of a roll back propagation, and to compute the recovery line, discussed below, during a recovery mode. Preferably, the central recovery coordinator 75 will include a copy of the fault tolerant process list 25 which lists all of the application processes that are currently being monitored by the fault tolerant computing system 5 and where each process is executing.

In addition, the central recovery coordinator 75 will preferably include a global checkpoint coordinator 77 for maintaining a set of consistent global checkpoints. A global checkpoint is a set of checkpoints, with one checkpoint from each monitored application process. According to the roll back propagation rule, if a sender of a message rolls back to its latest checkpoint and unsends a message, the receiver of that message must also roll back to unreceive the message. Thus, a consistent global checkpoint is a global checkpoint that does not contain any two checkpoints violating the roll back propagation rule.

In one embodiment, whenever a checkpoint is initiated and successfully executed by one process, using the checkpoint function described below, the central recovery coordinator 75 is notified. The central recovery coordinator 75 will thereafter preferably broadcast a message to all of the other monitored application processes in order for them to take appropriate checkpoints in order to guarantee that the resulting set of checkpoints is consistent.

In addition, globally consistent checkpoints can be ensured by implementing communication induced checkpoints, wherein a process that receives a message will take a checkpoint if the sender's checkpoint interval number, as indicated in the message header information, is greater than the checkpoint interval number of the receiver. Thereafter, the watchdog 15 associated with the receiver process will transmit an indication of the new checkpoint to the global checkpoint coordinator 77 of the central recovery coordinator 75.

In an alternate embodiment, an uncoordinated checkpoint system using lazy checkpoint coordination may be implemented. For a discussion of a lazy checkpoint coordination scheme, see Yi-Min Wang and W. Kent Fuchs, "Lazy Checkpoint Coordination for Bounding Rollback Propagation," Proc. IEEE Symposium Reliable Distributed Systems, pp. 78–85 (October 1993), incorporated herein by reference.

Figure 15A:
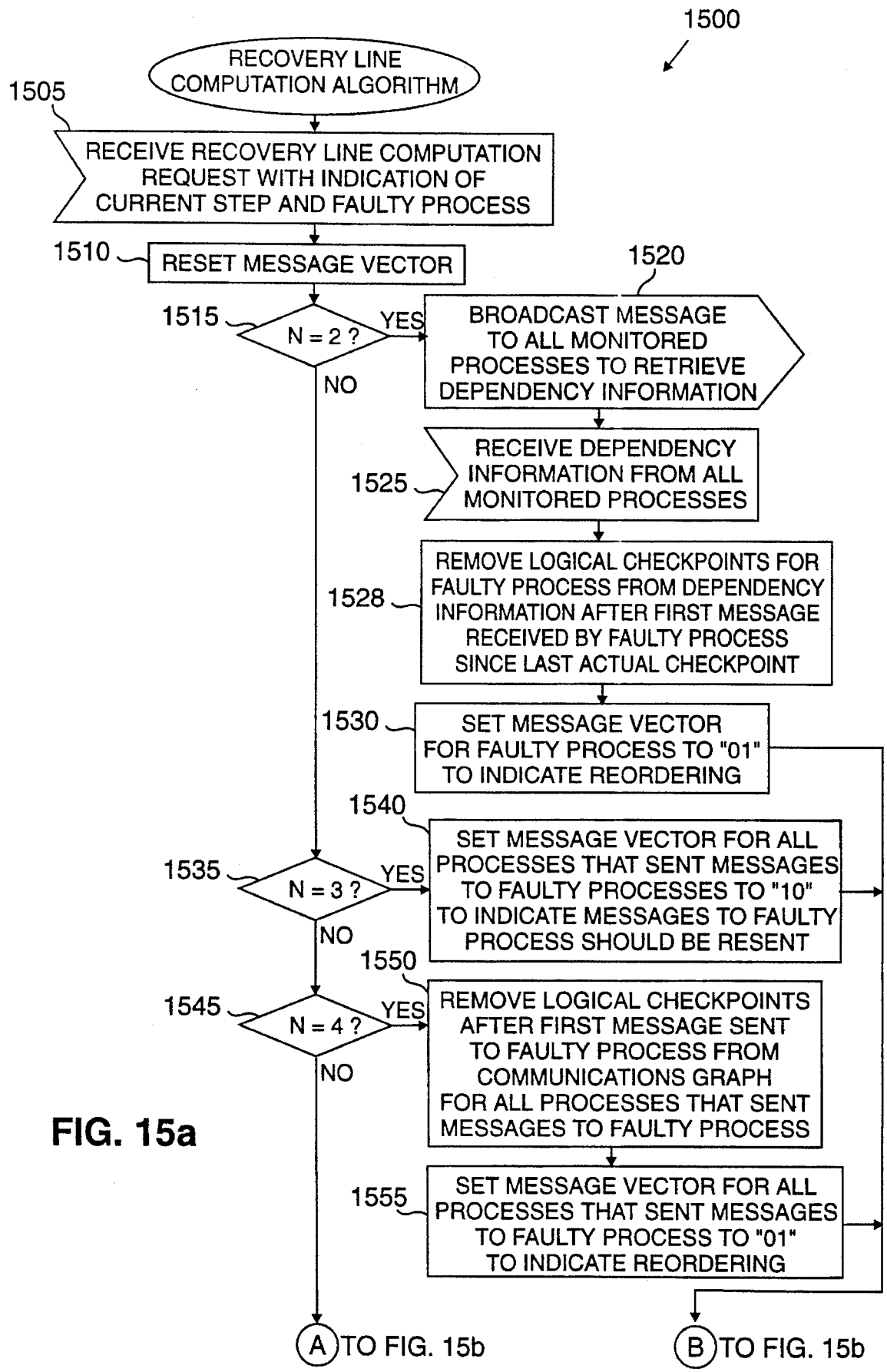
FIGS 15a and 15b, collectively, are a flowchart describing an exemplary recovery line computation algorithm, which is utilized by the central recovery coordinator in computing a new recovery line for various steps of the progressive retry recovery algorithm of FIG. 7.
Figure 15B:
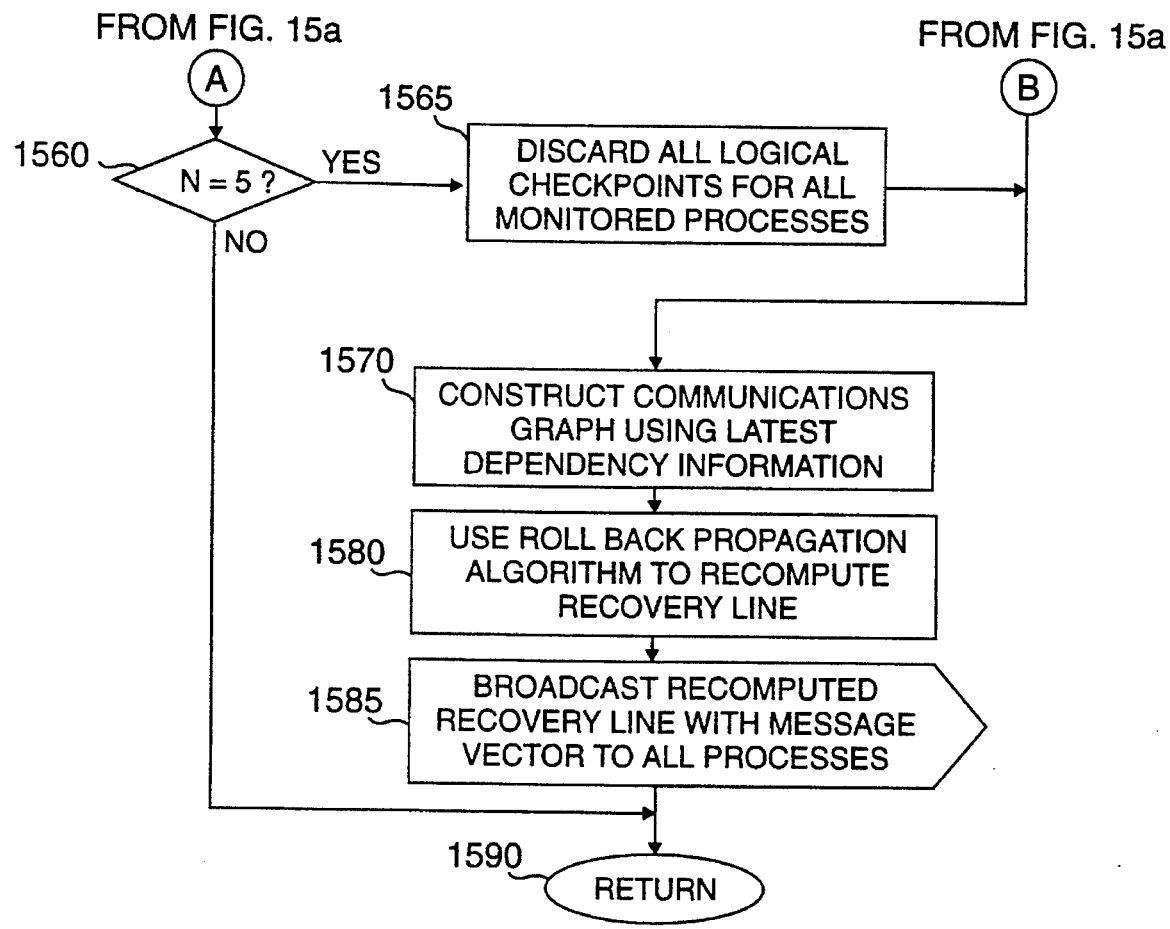

In addition, the central recovery coordinator 75 will preferably also include a recovery line computation subsystem 79, which will implement a recovery line computation algorithm 1500, discussed in detail below in conjunction with FIGS. 15a and 15b.

RECOVERY CONCEPTS AND DEFINITIONS

For a detailed discussion of recovery concepts and definitions, see Yi-Min Wang et al., "Progressive Retry Technique for Software Error Recovery in Distributed Systems", Proc. of 23d IEEE Conf. on Fault-Tolerant Computing Systems (FTCS), pp. 138–144 (June, 1993), incorporated herein by reference.

Figure 2A:
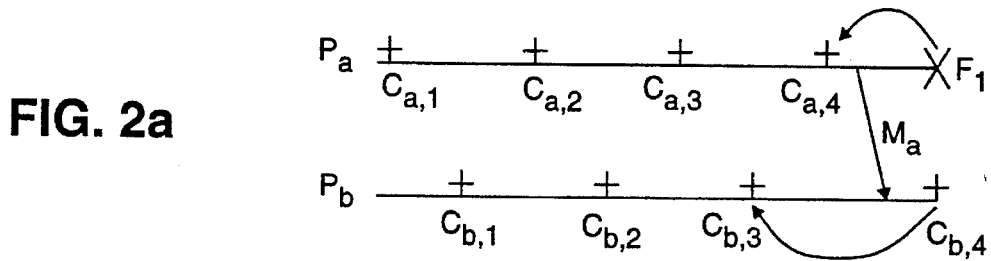
FIGS. 2a and 2b illustrate a communication graph and demonstrate actual checkpoints and logical checkpoints.

Generally, if the error detection monitor 20 detects a fault in a process, such as the process $P_a$ shown in FIG. 2a, at the point marked "$F_1$", then the restart subsystem 30 of the watchdog 15 will initiate a roll back of process $P_a$ to the latest checkpoint $C_{a,4}$ associated with the process $P_a$, by restoring the latest checkpoint data associated with process $P_a$ from the critical memory copy 88. The roll back of process $P_a$ to its checkpoint $C_{a,4}$ will unsend message $M_a$. Accordingly, process $P_b$ must also roll back to a state before the receipt of $M_a$ to unreceive the message $M_a$ in order to satisfy the roll back propagation rule, which states that if a sender rolls back and unsends a message, the receiver must also roll back to unreceive the message. Otherwise, message $M_a$ is recorded in the fault tolerant computing system 5 as "received but not yet sent", which results in an inconsistency of the system state.

However, according to a feature of the invention, process $P_a$ can reconstruct the state from which $M_a$ was generated, thereby allowing the execution of $P_b$ based on the receipt of $M_a$ to remain valid. Thus, process $P_b$ need not roll back to unreceive message $M_a$. This can be achieved by utilizing the piecewise deterministic assumption, discussed below, and the messages that were logged for process $P_a$ in the receiver and sender log files 90, 92 since the latest actual checkpoint.

Although the receipt of each message by a process is an unpredictable or nondeterministic event, the piecewise deterministic assumption states that process execution between any two consecutive received messages, called a state interval, is deterministic. So, if a process has logged both the message content and the processing order of the received messages, then deterministic replay of the messages in the log allows state reconstruction of the respective process. As previously indicated, each time a message is received by a process, the nondeterministic event is logged in the receiver log file 90, which effectively places a "logical" checkpoint at the end of the ensuing state interval. In this manner, the extra "logical" checkpoints serve to minimize the domino effect of rollback propagation which would tend to include other processes in the recovery.

Figure 2B:
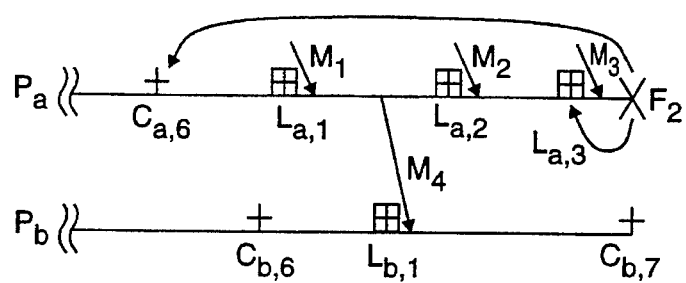

As shown in FIG. 2b, the latest actual checkpoint, $C_a$, associated with the process $P_a$ allows restoration of the process state at the point where the checkpoint was taken. In addition, the message log and the piecewise deterministic assumption effectively place "logical" checkpoints $L_{a,1}$, $L_{a,2}$ and $L_{a,3}$, at the end of the state interval started by each received message, because of the capability of state reconstruction. Thus, although process $P_a$ physically rolls back to checkpoint $C_{a,6}$, shown in FIG. 2b, it may "logically" roll back to the latest "logical" checkpoint $L_{a,3}$ and therefore does not need to unsend message $M_4$. Accordingly, the roll back of process $P_a$ does not need to involve process $P_b$.

Thus, while the "physical roll back distance" may determine the roll back extent of each individual process, the "logical roll back distance" controls the extent of rollback propagation on other processes and therefore the number of processes involved in the recovery.

Although the piecewise deterministic assumption can be exploited to limit the scope of a rollback, it may not be valid throughout the entire execution. For example, some nondeterministic events may depend on functions of real time and cannot simply be recorded and replayed. For example, a particular process may only send a particular message if it is before 2 p.m. Accordingly, if a recovery is initiated shortly after 2 p.m., the message should not be regenerated. Thus, to merely replay all of the messages in the message log may not be accurate.

Thus, according to one feature of the invention, discussed in detail below, the messages regenerated by a process during recovery are compared to the messages stored by the process in the message log during the initial execution to verify the assumption of piecewise deterministic execution. For example, as shown in FIG. 2b, upon regenerating message $M_4$ during a recovery mode, the message regenerated by process $P_a$ is compared to the message stored in the sender log file 92 during the initial processing. If the messages are identical, the piecewise deterministic assumption is validated and the message need not be retransmitted to the process $P_b$. Thus, process $P_b$ need not participate in the roll back. If, however, it is determined that the regenerated message $M_4$ is not identical to the message stored in the sender log file 92, an intervening nondeterministic event must have occurred. Thus, the process $P_a$ can only reconstruct its state up to the latest actual or logical checkpoint that is before the nondeterministic event, such as the logical checkpoint $L_{a,1}$, shown in FIG. 2b. Thus, all the logical checkpoints beyond the nondeterministic event, $L_{a,2}$ and $L_{a,3}$, become unavailable and must be discarded. Thus, process $P_a$ must unsend message $M_4$ and process $P_b$ must roll back to its latest logical checkpoint before the receipt of message $M_4$, namely, logical checkpoint $L_{b,1}$.

According to a further feature of the invention, certain steps of the progressive retry recovery algorithm 700, discussed further below, will attempt to bypass software faults by reordering certain messages in the receiver log file 90 of one or more application processes. Thus, it is important to recognize which messages can be reordered and which messages must be replayed in their original order to ensure correctness.

Figure 3:
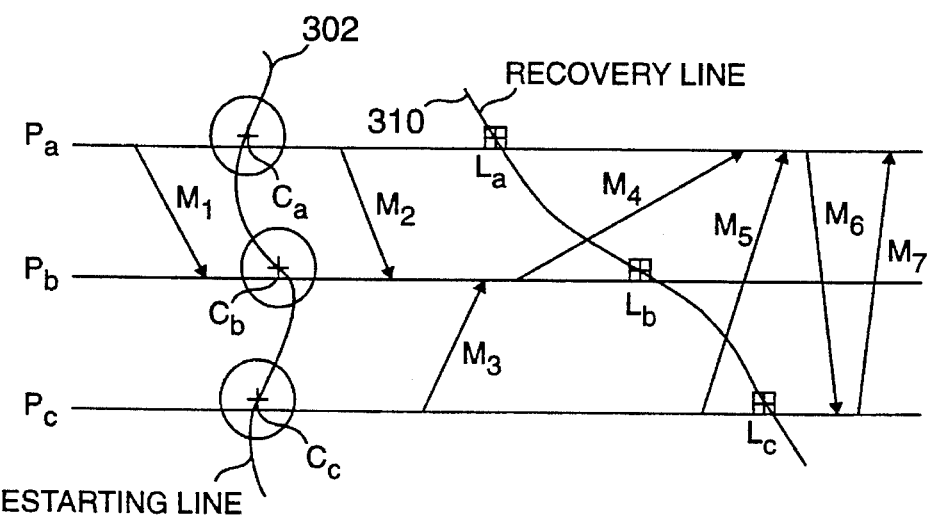
FIG. 3 illustrates a communication graph and demonstrates the a restart and recovery line and the classification of messages.

As shown in FIG. 3, in order to reconstruct the state of processes involved in a recovery up to the recovery line 310, the fault tolerant computing system 5 can restart the processes from the restart line 302, which is the latest actual checkpoint for each process before the recovery line 310, by restoring the critical memory copy 88 associated with each checkpoint. The recovery line 310, preferably calculated by the central recovery coordinator 75 as discussed above, will be positioned at the latest available globally consistent set of logical or actual checkpoints.

Messages that were processed before the restart line 302, such as message $M_1$, are referred to as obsolete messages and are not useful for recovery. Messages that were received and processed between the restart line 302 and the recovery line 310, such as messages $M_2$ and $M_3$, must have both their message contents and processing order logged in the receiver log file 90. These messages are referred to as deterministic messages, and they must be replayed in their original order for deterministic reconstruction, after restart in order to reach the recovery line 310.

For messages that were sent before the recovery line 310 and processed by the receiver after the recovery line 310, referred to as in-transit messages, such as messages $M_4$ and $M_5$, only the message content information in the logs are valid. The processing order for in-transit messages is either not logged or invalid. The in-transit messages are effectively still traveling in the communication channels and therefore can arrive in an arbitrary order due to unknown transmission delays. In-transit messages. are the only messages that can be reordered.

Finally, messages sent after the recovery line 310, referred to as orphan messages, such as messages $M_6$ and $M_7$, are unsent and unreceived with respect to the recovery line. Thus, orphan messages are invalidated upon roll back and should be discarded by the receiving process otherwise the recovery line is inconsistent.

DATA STRUCTURES FOR IMPLEMENTING FAULT TOLERANCE

The fault tolerant process list 25, shown in FIG. 4a, maintains information on those processes that are being monitored by the fault tolerant computing system 5. In a preferred embodiment, an identical copy of the fault tolerant process list 25 is maintained by the watchdog 15 of each node. The fault tolerant process list 25 maintains a plurality of rows, such as rows 405, 407, 409 and 411, each associated with a monitored application process. For each application process listed in column 420, the fault tolerant process list 25 includes an indication in column 425 of the Inter Process Communication (IPC) port of the local node that should be utilized to communicate with the process.

In a multiple node environment, the fault tolerant process list 25 preferably includes columns 430 and 435 for indicating the primary node upon which each application process should execute if the primary node is active and a list of backup nodes for the application process in the event that the primary node is not operating, as well as an indication in column 440 of the current node where the associated application process is executing.

The fault tolerant process list 25 will also include in column 445 an indication of the critical files, such as the critical memory copy 88 and the receiver and sender log files 90, 92, associated with each process. Finally, the fault tolerant process list 25 may optionally include a time limit in column 448, which, in a passive error detection monitoring arrangement, is the maximum time state that the watchdog 15 should wait between heartbeat messages before concluding that the application process is hung.

In a multiple node environment, each watchdog 15 in the fault tolerant computing system 5 preferably maintains a node list 32, shown in FIG. 4b, which lists each of the nodes that are currently active in the fault tolerant computing system 5. In a preferred embodiment, each node in the node list 32, such as the nodes 10 and 12, preferably monitors the next node enumerated in the node list 32. Thus, the order of the nodes in the node list 32 determines the ring configuration. If a node is taken out of service, this information is preferably broadcast to each surviving node, in a manner described below, in order that the node list 32 stored at each node may be properly updated.

As previously indicated, each message that is received or sent by an application process is preferably logged in receiver and sender log files 90, 92, respectively. A receiver log file 90, shown in FIG. 5a, is preferably maintained for each process monitored by the fault tolerant computing system 5 in order to store information for each message received by the associated process. Preferably, each message is logged in the receiver log file 90 upon receipt by the application process and prior to be being processed.

The receiver log file 90 maintains a plurality of rows, such as rows 502, 504, and 506, each associated with a message received by the associated process since the last successful checkpoint. For each received message listed in column 520, the receiver log file 90 includes an indication in column 522 of the message size and an indication in column 524 of the message contents. The information in columns 522 and 524 may be used for comparison in a recovery mode to verify the piecewise deterministic assumption, in a manner described below. It is noted that the message identification appearing in column 520 is for presentation purposes only.

In addition, the receiver log file 90 includes an indication in column 526 of the sender's process identifier, which may be assigned during system initialization by the watchdog 15 of the sender's local node or by the central recovery coordinator 75, as well as an indication in column 528 of the sender's checkpoint interval number and an indication in column 530 of the sender's logical checkpoint number. The information in columns 528 and 530 is utilized in a recovery mode for rollback propagation to determine the recovery line, in a manner described below. As discussed below, the sender's checkpoint interval number is incremented each time a checkpoint is successfully executed for the associated application process, and the sender's logical checkpoint number is incremented each time a new message is received by the sender.

Finally, the receiver log file 90 may optionally include an indication in column 532 of a reference identification number associated with each message. The reference identification number may be used in the progressive retry recovery algorithm to control whether the messages received from the same sender may be reordered. In one embodiment, messages that are in the receiver log file 90 from the same sender having the same reference identification number cannot be reordered. Messages from the same sender having different reference identification numbers can be reordered.

In a preferred embodiment, each time the associated process successfully executes a checkpoint, a "dummy" entry is preferably placed in the receiver log file 90. In this manner, messages in the receiver log file 90 may be associated with the proper checkpoint interval number of the receiver in order that messages received since the latest actual checkpoint can be identified during certain steps of the progressive retry recovery algorithm 700.

Similarly, a sender log file 92, shown in FIG. 5b, is preferably maintained for each process monitored by the fault tolerant computing system 5 in order to store information for each message sent by the associated process. The sender log file 92 maintains a plurality of rows, such as rows 552, 554, 556 and 558, each associated with a message sent by the associated process since the last successful checkpoint. For each sent message listed in column 570, the sender log file 92 includes an indication in column 572 of the message size and an indication in column 574 of the message contents. The information in columns 572 and 574 may be used for comparison in a recovery mode, in a manner described below. It is noted that the message identification appearing in column 570 is for presentation purposes only.

In addition, the sender log file 92 includes an indication in column 576 of the receiver's process identifier, which may be assigned during system initialization by the watchdog 15 of the receiver's local node or by the central recovery coordinator 75, as well as an indication in column 578 of the sender's logical checkpoint number. As discussed above, the sender's logical checkpoint number is incremented each time a new message is received by the sender.

The receiver and sender log files 90 and 92, shown in FIGS. 5a and 5b, respectively, have been populated with information for process $P_2$, discussed below in conjunction with FIGS. 6a through 6f.

MULTIPLE NODE OPERATION

In a multiple node environment, each watchdog 15 will also preferably monitor the watchdog 15 of another node in a circular fashion to detect node failures. For a discussion of fault tolerance in a multiple node environment, see U.S. patent application Ser. No. 07/954,549, entitled "Apparatus and Method for Fault-Tolerant Computing," filed Sep. 30, 1992, which is assigned to the assignee of the present invention; and R. Bianchini, Jr. and R. Buskens, "An Adaptive Distributed System-Level Diagnosis Algorithm and Its Implementation," Proc. of 21st IEEE Conf. on Fault Tolerant Computing Systems (FTCS), pp. 222–29 (July 1991), each incorporated herein by reference.

Generally, in a multiple node environment, the watchdog 15 in each node monitors the status of application processes executing locally on the respective node, as well as the status of at least one other node. The watchdog 15 preferably includes a node list 32, discussed above in conjunction with FIG. 4b, which may be utilized to indicate which node or nodes the watchdog 15 is monitoring. An identical copy of the node list 32 is preferably available to the watchdog 15 in each node. When a first node fails, it will be detected by the watchdog 15 on another node that is watching the first node. The watching watchdog 15 will broadcast a message to the surviving nodes to indicate that the node list 32 should be modified to reflect the loss of the failed node. In addition, the backup nodes, as indicated in column 435 of the fault tolerant process list 25, for each process that was executing on the failed node immediately prior to the detected failure should restart the respective processes.

In order for a watchdog 15 in one node to restart an application process from another node, however, the watching watchdog 15 must have a copy of the state of that process. Thus, as previously indicated, each node will include nonvolatile memory 44 for maintaining copies of the state of processes executing on the local node, including a checkpoint copy of the critical memory 88 of each process, as well as the receiver and the sender log files 90, 92 for each local process. In addition, in a multiple node environment, the process state is copied from the primary node to the backup node associated with the watching watchdog 15. In a preferred embodiment, copies are made by the watchdog 15 in the watched node and sent to the watching watchdog 15 each time there is a significant change in the critical memory copy 88 or in log files 90, 92 for the respective application process.

As is apparent from the foregoing, each watchdog 15 must know where each monitored application process is running in the fault tolerant computing system 5 at any given time. This information is preferably contained in column 440 of the fault tolerant process list 25, of which each watchdog 15 has an identical copy. The fault tolerant process list 25 may be kept consistent by having each watchdog 15 broadcast a message when it starts or restarts a monitored process to all the other watchdogs 15 and having each watchdog 15 respond to such a message by updating the fault tolerant process list 25 as required by the message.

When a previously failed node returns to service, the watchdog 15 in that node obtains a copy of the node list 32 and fault tolerant process list 25 from the watchdog 15 in another node. The fault tolerant process list 25, discussed above in conjunction with FIG. 4a, indicates which nodes are currently executing the application processes local to the previously failed node and the location of the state files containing the state of the local processes which are necessary to restart those processes. The watchdog 15 obtains copies of the files from the nodes currently executing the processes and restarts the processes using the state copies. As indicated above, when the watchdog 15 restarts a process, it sends a message to the other watchdogs 15 in the fault tolerant computing system 5, and if a watchdog 15 is running the restarted process, that watchdog 15 ceases running the process and modifies its fault tolerant process list 25 to indicate that the process is now running on the proper primary node. All of the other watchdogs 15 simply modify their fault tolerant process list 25, in the manner just indicated.

FAULT TOLERANT LIBRARY FUNCTIONS

According to one feature of the invention, an application process can be made fault tolerant by inserting appropriate functions from the fault tolerant library 82, into the code for the application process. As previously indicated, the fault tolerant library 82 preferably includes a heartbeat function, which, when invoked by an application process, will send a heartbeat message at specified intervals to the watchdog 15, indicating that the associated process is still active. If the watchdog 15 does not receive another signal from the application process before the end of the specified interval, the watchdog 15 will presume that the application process is hung or has crashed.

In addition, the fault tolerant library 82 includes a critical memory function which allows a user to selectively specify which data in the application process is critical data, which will then be copied to an area of nonvolatile memory 44 each time a checkpoint function is executed by the application process.

Thus, upon a call to a checkpoint function by an application process, the critical data is preferably stored on a stable storage device. In addition, upon each successful checkpoint execution, the checkpoint interval number of the associated application process, which is the interval between two consecutive checkpoints, is preferably incremented. Once the checkpoint function has been successfully performed, a message containing the checkpoint filename, the process identifier and the current checkpoint interval number is sent to the watchdog 15. In this manner, the watchdog 15 can utilize this information to replicate the checkpoint file onto one or more backup nodes and to notify the global checkpoint coordinator 77 of the new checkpoint in a coordinated checkpoint environment. This will preferably cause the global checkpoint coordinator 77 to initiate a global checkpoint of the remaining monitored processes.

In addition, the fault tolerant library 82 preferably includes a recover function that will allow an application process to recover the checkpointed data from the critical memory copy 88 during a recovery mode, as described further below.

The fault tolerant library 82 preferably also includes a fault tolerant write function, hereinafter referred to as ftwrite, which logs each output message in the sender log file 92 before the message is transmitted by the application process. In a multiple node environment, the output data is also duplicated and logged by the watchdog 15 on a backup machine. When an application process is in a normal mode, the ftwrite function will send messages to other processes and add the information for each sent message to the sender log file 92.

Each message that is sent by the ftwrite function preferably includes a message identifier, the sender's process identifier, the sender's checkpoint interval number and logical checkpoint number, and an optional reference identification number. The checkpoint interval number can be utilized to implement coordinated checkpoints. As previously indicated, the reference identification number can be utilized to indicate whether messages from the same sender can be reordered.

In a recovery state, however, after a logged message is processed, the ftwrite function is executed to compare each newly generated message to the corresponding message in the sender log file 92, in a manner described below, in order to verify the piecewise deterministic assumption. If the message generated during recovery is identical to the message stored in the sender log file 92 during the previous execution, the message need not be retransmitted. If, however, the messages are not identical, a nondeterministic event has occurred, and the scope of the recovery must be increased, in a manner described below.

The fault tolerant library 82 preferably also includes a fault tolerant read function, hereinafter referred to as ftread, which logs input messages in the receiver log file 90 before they are processed by the receiving application process. In a multiple node environment, the input data is also duplicated and logged by the watchdog 15 on a backup machine. When an application process is in a normal mode, the ftread function will read data from an IPC channel and log the received message in the receiver log file 90.

In a recovery state, however, the input data will be read from the receiver log file 90 up to the recovery line 310 before any data can be read from a regular input channel, in a manner described below. In a preferred embodiment, the ftread function checks the sender's checkpoint interval number associated with each received message, and initiates a checkpoint of the associated receiving application process if the sender's checkpoint interval number is greater than the receiver's current checkpoint interval number, thereby ensuring globally consistent checkpoints. In addition, if the ftread function receives a checkpoint control message from the central recovery coordinator 75, the ftread function will initiate a checkpoint of the application process.

FIGS. 6a through 6f illustrate a communication pattern for a plurality of concurrent application processes and indicate how the processes are affected by the various steps of the progressive retry recovery algorithm 700, discussed below in conjunction with FIGS. 8 through 11. FIGS. 6a through 6f will be referenced below, during the discussion of the progressive retry recovery algorithm 700, to illustrate each step of the progressive retry recovery algorithm 700.

FIGS. 6a through 6f utilize the following conventions to illustrate various recovery concepts. The addition sign, "+", associated with each process indicates the temporal position of the latest actual checkpoint for each process. An addition sign in a square box indicates the temporal position of the logical checkpoints for each process. A square box without an addition sign indicates the latest valid logical checkpoint which will form the recovery line for each process. Finally, when the addition sign indicating the latest actual checkpoint is positioned inside a circle, it is an indication that the associated process is involved in the current step of the progressive retry recovery.

PROGRESSIVE RETRY RECOVERY ALGORITHM

Figure 7:
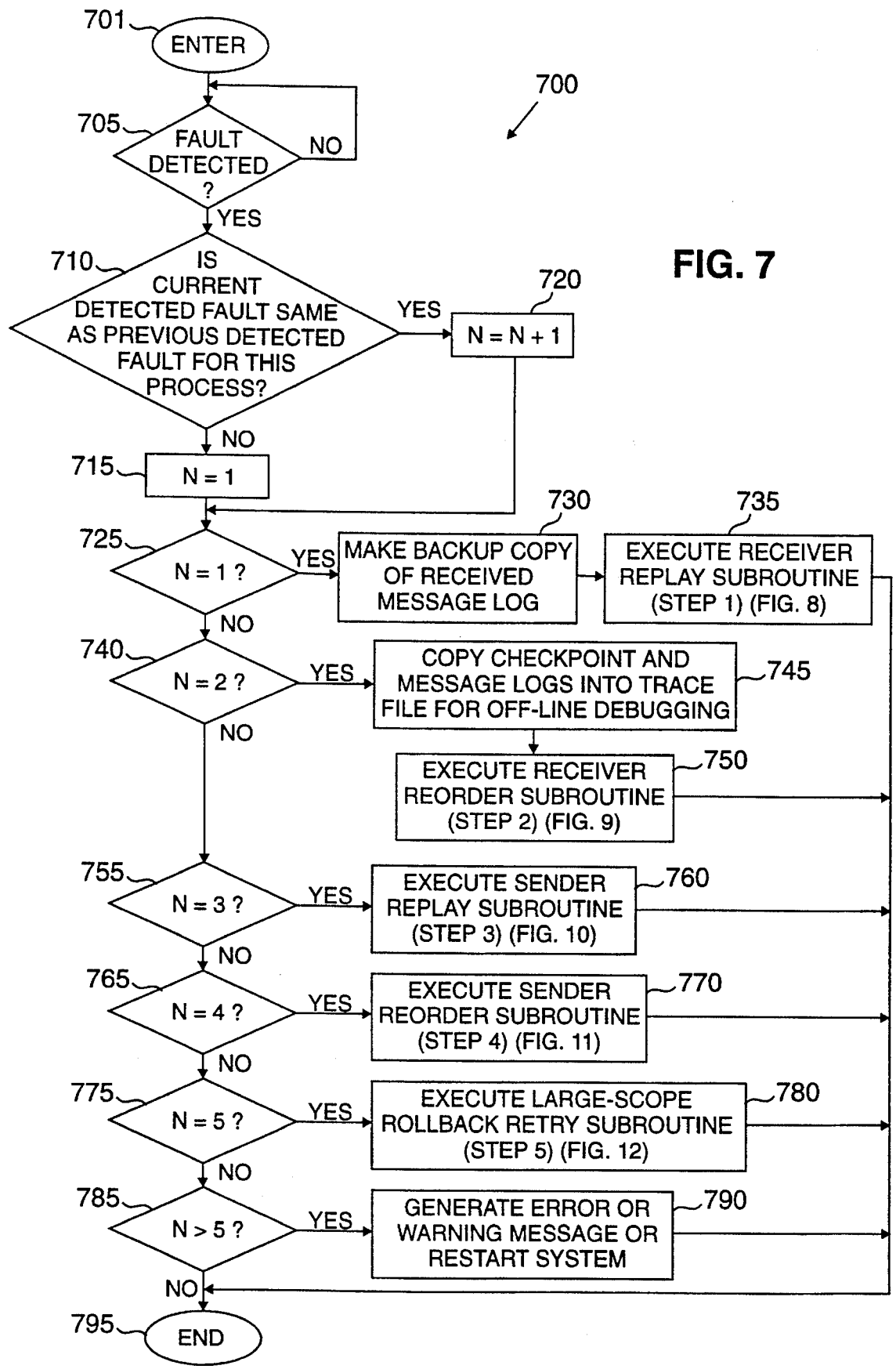
FIG. 7 is a flowchart describing an exemplary progressive retry recovery algorithm as utilized by the restart subsystem in recovering from a detected fault.

The progressive retry recovery algorithm 700 embodying principles of the present invention will be entered at step 701, as shown in FIG. 7. A test is repeatedly performed during step 705 until the error detection monitor 20 of the watchdog 15 detects a fault in a monitored application process. Once a fault is detected during step 705, a test is performed during step 710 to determine if the current detected fault is the same as the previous detected fault for this process. In one embodiment, a fault detected within a predefined time threshold of a previous fault for the same process is assumed to be the same fault. If it is determined during step 710 that the current detected fault is not the same fault as the previous detected fault for this process, if any, then this is the first attempt to remedy this fault, and the progressive retry method should be started at step 1 to attempt to recover the faulty process.

Thus, a counter variable, N, which will control which step of the progressive retry recovery algorithm 700 is currently executing, is set to 1 during step 715, indicating that the first step of the progressive retry recovery algorithm 700 should be attempted. If, however, it is determined during step 710 that the current detected fault is the same fault as the previous detected fault for this process, then previous attempts to remedy this fault have been unsuccessful. Accordingly, the scope of the progressive retry recovery algorithm 700 should be increased in order to attempt to recover the faulty process. Thus, the counter variable, N, is incremented by 1 during step 720, indicating that the next step of the progressive retry recovery algorithm 700 should be attempted.

A test is performed during step 725 to determine if the current value of the counter variable, N, is equal to one. If it is determined during step 725 that the value of the counter variable, N, is equal to one, then a backup copy of the receiver log file 90 associated with the faulty process is initially made during step 730. As each step of the progressive retry recovery algorithm 700 is attempted, information in the receiver log file 90 will be discarded. The backup copy of the receiver log file 90 will thus preferably allow the information to be accessed, if necessary.

Figure 8:
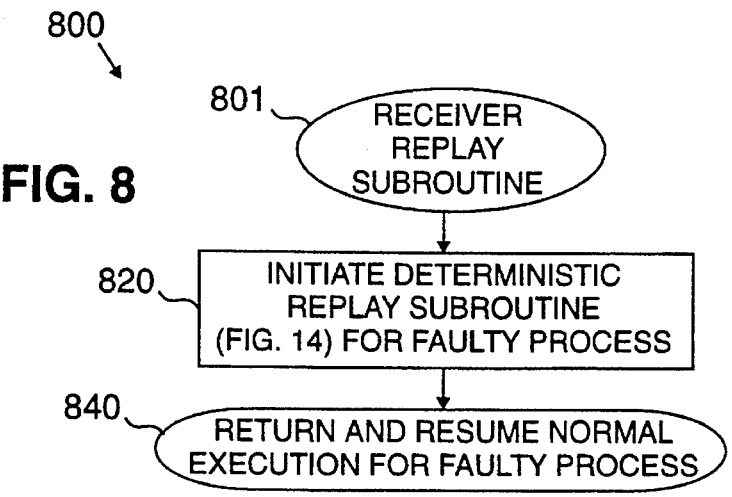
FIG. 8 is a flowchart describing an exemplary receiver replay subroutine, which is utilized during step 1 of the progressive retry recovery algorithm of FIG. 7.

The receiver replay subroutine 800, discussed below in conjunction with FIG. 8, which is step 1 of the progressive retry method, is executed during step 735. Thereafter, program control will proceed to step 795, where the progressive retry recovery algorithm 700 will be exited. The faulty process will then resume normal program execution to attempt to bypass the previously detected software fault. If the fault is not bypassed during the second execution, the progressive retry recovery algorithm 700 will be reinitiated upon the next detected fault and will proceed to the step 2 retry.

If, however, it was determined during step 725 that the value of the counter variable, N, is not equal to one, then a test is performed during step 740 to determine if the value of the counter variable, N, is equal to two. If it is determined during step 740 that the value of the counter variable, N, is equal to two, then the likely source of the fault is a message received from another process. Thus, a copy of the checkpoint file and the receiver and sender log files 90 and 92 are preferably copied into a trace file during step 745 for off-line debugging.

The receiver reorder subroutine 900, discussed below in conjunction with FIG. 9, which is step 2 of the progressive retry method, is then executed during step 750. Thereafter, program control will proceed to step 795, where the progressive retry recovery algorithm 700 will be exited. All of the monitored processes will then resume normal program execution to attempt to bypass the previously detected software fault. If the fault is not bypassed, the progressive retry recovery algorithm 700 will be reinitiated upon the next detected fault and will proceed to the step 3 retry.

If, however, it is determined during step 740 that the value of the counter variable, N, is not equal to two, then a test is performed during step 755 to determine if the value of the counter variable, N, is equal to three. If it is determined during step 755 that the value of the counter variable, N, is equal to three, then the sender replay subroutine 1000, discussed below in conjunction with FIG. 10, which is step 3 of the progressive retry method, is then executed during step 760. Thereafter, program control will proceed to step 795, where the progressive retry recovery algorithm 700 will be exited. All monitored processes will resume normal program execution to attempt to bypass the fault. If the fault is not bypassed, the progressive retry recovery algorithm 700 will be reinitiated upon the next detected fault and will proceed to the step 4 retry.

If, however, it is determined during step 755 that the value of the counter variable, N, is not equal to three, then a test is performed during step 765 to determine if the value of the counter variable, N, is equal to four. If it is determined during step 765 that the value of the counter variable, N, is equal to four, then the sender reorder subroutine 1100, discussed below in conjunction with FIG. 11, which is step 4 of the progressive retry method, is then executed during step 770. Thereafter, program control will proceed to step 795, where the progressive retry recovery algorithm 700 will be exited until the next fault is detected.

If, however, it is determined during step 765 that the value of the counter variable, N, is not equal to four, then a test is performed during step 775 to determine if the value of the counter variable, N, is equal to five. If it is determined during step 775 that the value of the counter variable, N, is equal to five, then the large-scope roll back retry subroutine 1200, discussed below in conjunction with FIG. 12, which is step 5 of the progressive retry method, is executed during step 780. Thereafter, program control will proceed to step 795, where the progressive retry recovery algorithm 700 will be exited until the next fault is detected.

If, however, it is determined during step 775 that the value of the counter variable, N, is not equal to five, then a test is performed during step 785 to determine if the value of the counter variable, N, is greater than five. If it is determined during step 785 that the value of the counter variable, N, is greater than five, then the progressive retry recovery algorithm 700 has not been able to recover the faulty process. Thus, the system should be restarted during step 790, with a full reinitialization. Alternatively, an error or warning message may be generated during step 790 indicating that the progressive retry recovery algorithm 700 has not successfully recovered the faulty process. Thereafter, program control will proceed to step 795, where the progressive retry recovery algorithm 700 will be exited until the next fault is detected.

STEP 1—RECEIVER REPLAY

As previously indicated, the progressive retry recovery algorithm 700 will execute the receiver replay subroutine 800 during step 1 of the progressive retry method. The receiver replay subroutine 800 will be entered at step 801, as shown in FIG. 8. The receiver replay subroutine (step 1) 800 will restore the faulty process to the latest checkpoint and then attempt to bypass the fault by replaying the received messages since the latest actual checkpoint in the receiver log file 90 of the faulty process. In a preferred embodiment, this is implemented by executing the deterministic replay subroutine 1400, discussed below in conjunction with FIGS. 14a and 14b, for the faulty process during step 820.

As discussed above, every message is preferably logged before it is processed. Thus, each of the messages that is sent or received by the faulty process prior to the detected fault is logged in the receiver and sender log files 90 and 92 of the faulty process. Thus, using the deterministic replay subroutine 1400, the logged messages can be replayed and the faulty process can reconstruct its state up to the point where it detected the error.

Figure 6A:
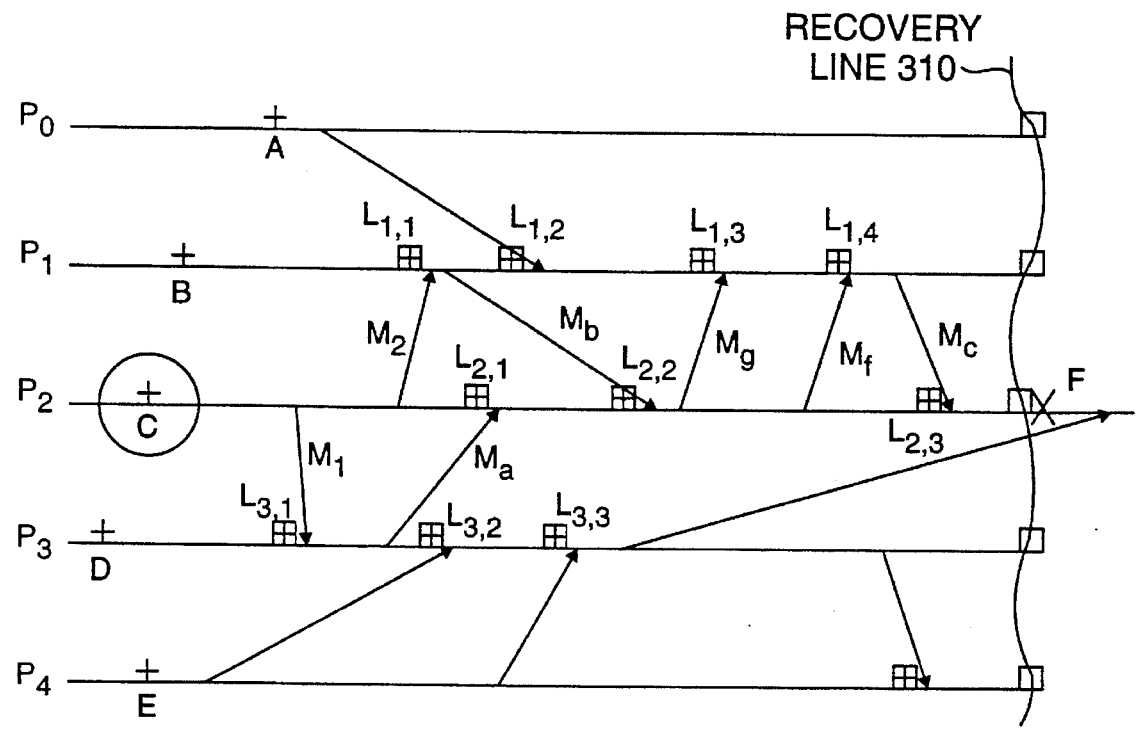
FIGS. 6a through 6f illustrate a communication pattern for a plurality of concurrent application processes and indicate how the processes are affected by the various steps of the progressive retry recovery algorithm of FIG. 7.

As shown in FIG. 6a, when a fault is detected for process $P_2$, by the error detection monitor 20 of the watchdog 15, at the point marked "F", the restart subsystem 30 of the watchdog 15 will initiate the progressive retry recovery algorithm 700 to attempt to bypass the fault. During step 1 retry, the deterministic replay subroutine 1400 will replay each of the messages in the receiver log file 90 of the process $P_2$ and attempt to bypass the fault based on the concept of environment diversity. In some cases, transient failures may be caused by some environmental factors, such as mutual exclusive conflicts, resource unavailability, unexpected signals, and the like, which may no longer be present at the time the recovery is executed, and Step-1 retry may succeed.

As discussed below, according to a feature of the present invention, the validity of the piecewise deterministic assumption is verified by the deterministic replay subroutine 1400 by evaluating each of the messages that are generated by the process $P_2$ during deterministic replay. If a message regenerated during recovery does not equal the message that was stored in the sender log file 92 during initial processing, a nondeterministic event must have occurred.

Figure 6B:
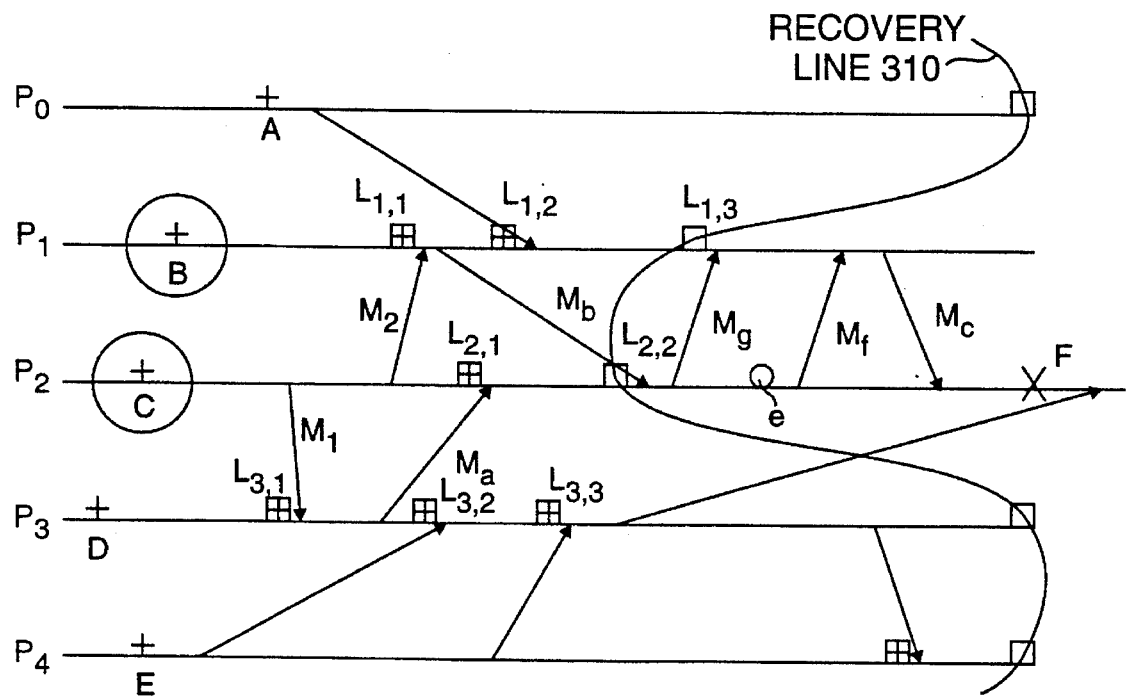

For example, as shown in FIG. 6b, the deterministic replay subroutine 1400 will replay each of the messages in $P_2$'s message logs up to message $M_f$. Upon regeneration of message $M_f$, the deterministic replay subroutine 1400 will determine that a nondeterministic event, e, has occurred, in a manner described below, which makes the previous version of message $M_f$ that was generated no longer valid. Thus, process $P_2$ can only reconstruct its state up to the logical checkpoint which is immediately before the nondeterministic event, e, and all the logical checkpoints beyond the nondeterministic event become unavailable and must be discarded. Accordingly, process $P_2$ must unsend message $M_f$, as well as message $M_g$, in order to roll back to logical checkpoint $L_{2,2}$ and thus involve process $P_1$ in the recovery, as shown by the new recovery line 310 in FIG. 6b. Process $P_1$ must roll back to its latest logical checkpoint before the unsent messages $M_g$ and $M_f$, namely to logical checkpoint $L_{1,3}$. It is noted that such a departure from previous execution offers an additional opportunity for bypassing a software fault causing a transient failure.

Following execution of the deterministic replay subroutine 1400 during step 820 (FIG. 8), program control will return during step 840 to the progressive retry recovery algorithm 700 and normal execution will resume for the faulty process. If the previously detected fault is bypassed, program control will continue. If, however, the fault has not been bypassed, the error detection monitor 20 will detect the fault again and will reinitiate the progressive retry recovery algorithm 700 with step 2 retry.

STEP 2—RECEIVER REORDER

As previously indicated, the progressive retry recovery algorithm 700 will execute the receiver reorder subroutine 900 during step 2 of the progressive retry method. The receiver reorder subroutine 900 will be entered at step 901, as shown in FIG. 9.

If the step 1 retry was unsuccessful, the fault is most likely caused by the messages received from other processes. In order to minimize scope of rollback, step 2 retry will first attempt to locally simulate other possible scenarios regarding the received messages without actually involving the senders.

As a general rule, the transmission delays of incoming communication channels are unpredictable. Thus, messages that are received from different processes cannot generally be assumed to have a particular arrival order. Thus, message reordering by the faulty process can be used to simulate different message arrival orders. It is noted, however, that messages from the same sender may require processing in the same order.

As discussed below, the faulty process will attempt to reorder all of the received messages that are listed in the faulty process' receiver log file 90. The receiver reorder subroutine (step 2) 900 will initially discard the processing order information during step 910 for each of the messages in the receiver log file 90 of the faulty process that were received by the faulty process since the latest actual checkpoint. This will serve to invalidate all of the logical checkpoints for the faulty process after the first received message.

Thereafter, the watchdog 15 associated with the faulty process will transmit a request during step 920 to the central recovery coordinator 75 to recompute the recovery line 310 for a step 2 recovery with an indication of the faulty process. The manner in which the central recovery coordinator 75 will process the request and recompute the recovery line is discussed below in conjunction with FIGS. 15a and 15b.

Once the central recovery coordinator 75 has recomputed the recovery line, it will broadcast the recomputed recovery line information to each monitored application process. Upon receipt of the recomputed recovery line, each monitored process will process the recovery line, substantially in parallel, and determine the appropriate response, as shown by the processing branches 930 and 940 in FIG. 9, for the processes $P_0$ and $P_N$, respectively.

Figure 13:
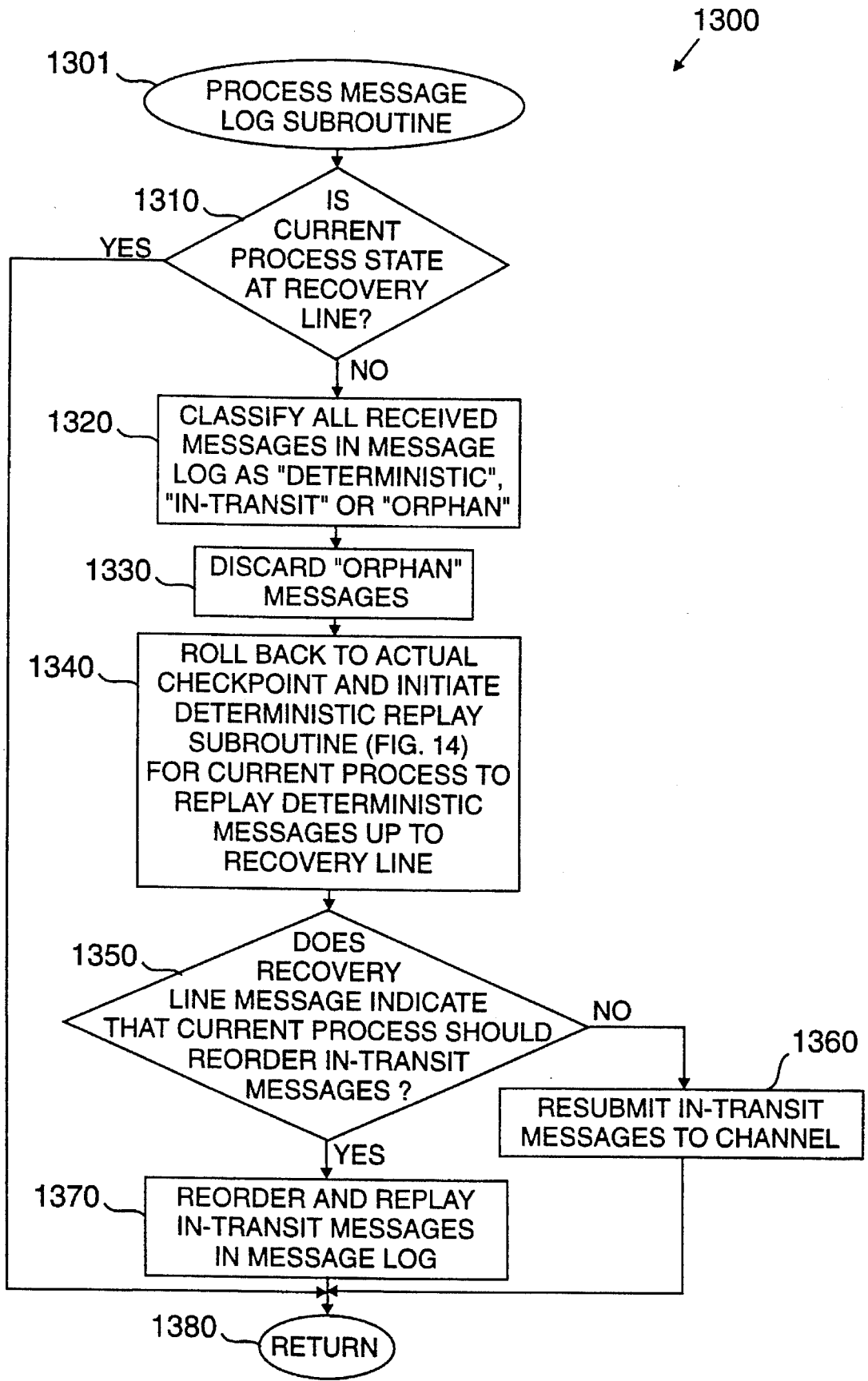
FIG. 13 is a flowchart describing an exemplary process message log subroutine, which is utilized during steps 2 through 5 of the progressive retry recovery algorithm of FIG. 7.

The process $P_0$ will receive the broadcasted recovery line 310 from the central recovery coordinator 75 during step 950. Thereafter, the process message log subroutine 1300, discussed below in conjunction with FIG. 13, is executed for process $P_0$ during step 960.

Since the processing order information for all of the messages in the receiver log file 90 of the faulty process has been discarded, the logical checkpoints of the faulty process after the first received message are no longer available. Thus, all of the messages sent by the faulty process will have to be unsent, and the receivers of any unsent messages will have to participate in the step 2 retry.

Figure 6C:
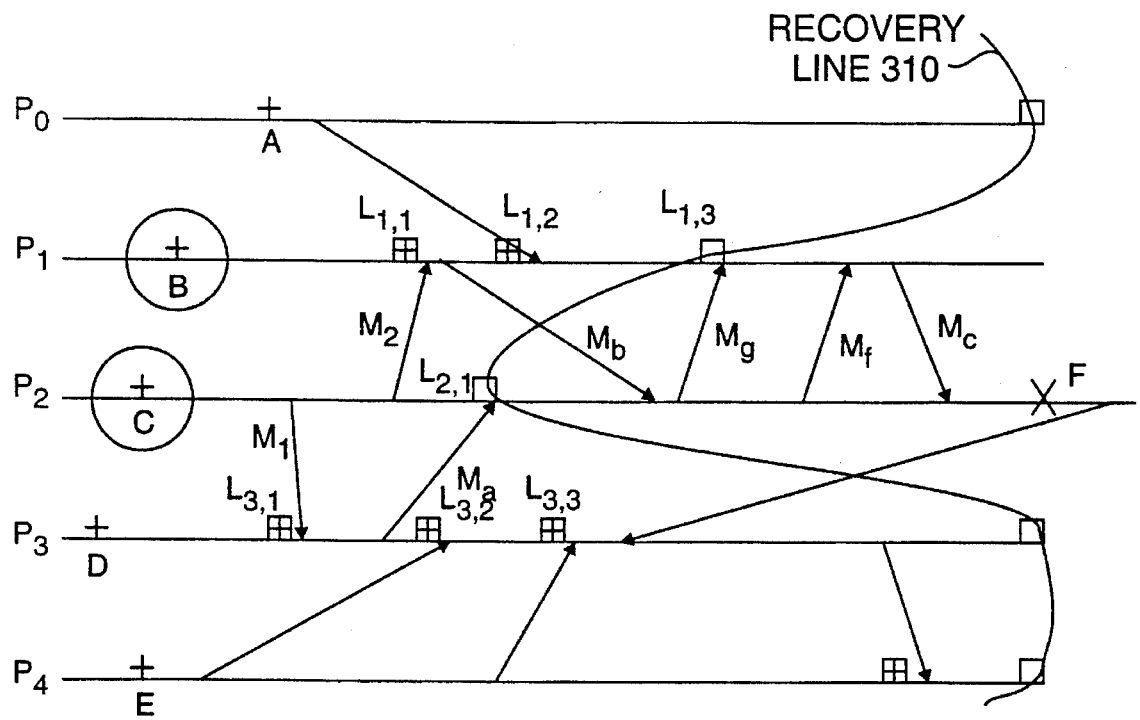

As shown in FIG. 6c, when a fault is again detected for process $P_2$, by the error detection monitor 20 of the watchdog 15, at the point marked "F", the restart subsystem 30 of the watchdog 15 will again initiate the progressive retry recovery algorithm 700 to attempt to bypass the fault. If the fault is the same as the previous detected fault, the progressive retry recovery algorithm 700 will initiate step 2 retry. Since the logical checkpoints of the faulty process $P_2$ after its first received message are no longer available, the recovery line will be set by the central recovery coordinator 75 as shown in FIG. 6c. The recovery will involve process $P_1$ since messages $M_g$ and $M_f$ have been unsent.

As discussed below, the messages in the message logs of processes $P_2$ and $P_1$ will be processed by the process message log subroutine 1300, in the manner described below in conjunction with FIG. 13, in an attempt to bypass the software fault.

Figure 9:
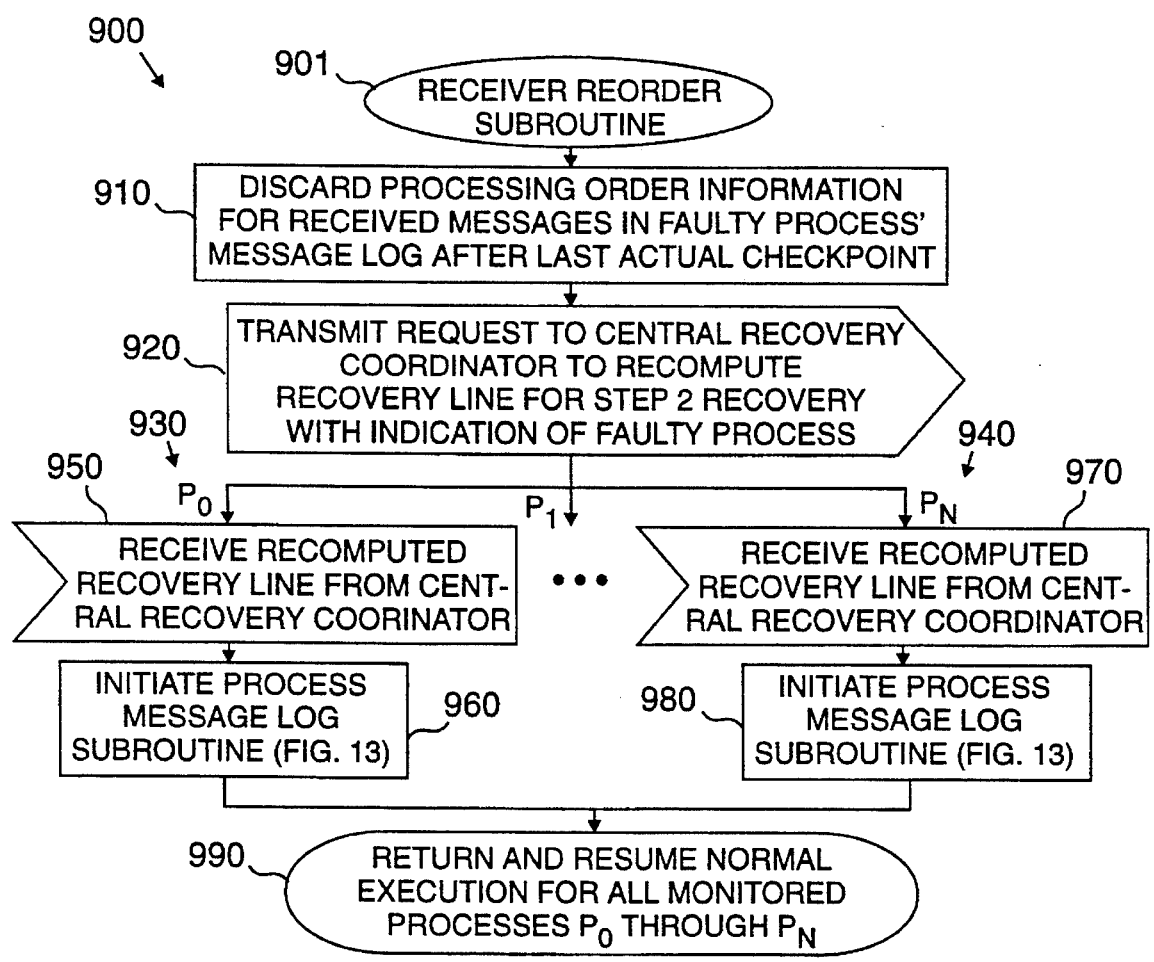
FIG. 9 is a flowchart describing an exemplary receiver reorder subroutine 900, which is utilized during step 2 of the progressive retry recovery algorithm of FIG. 7.

As shown in FIG. 9, the process $P_N$ will receive and process the broadcasted recovery line 310 during steps 970 and 980, which will be processed by the process $P_N$ substantially in parallel with the processing of process $P_0$ and all other monitored processes.

After all of the monitored processes have completed processing of the recomputed recovery line 310, program control will return during step 990 to the progressive retry recovery algorithm 700 and normal execution will resume for each monitored process, $P_0$ through $P_N$. If the previously detected fault is bypassed, program control will continue. If the fault is not bypassed, the error detection monitor 20 will detect the fault again and will reinitiate the progressive retry recovery algorithm 700 this time trying step 3.

STEP 3—SENDER REPLAY

Figure 10:
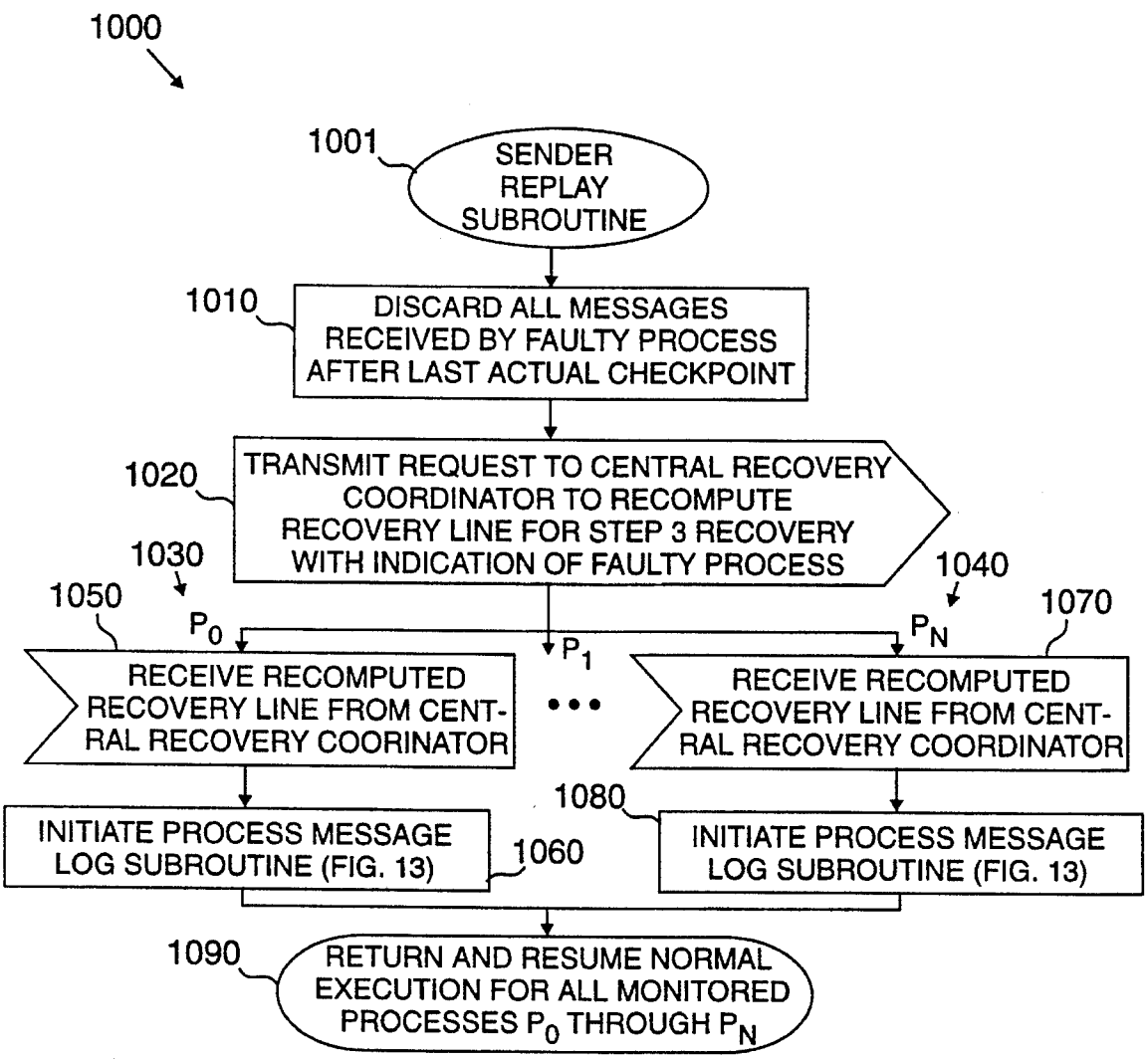
FIG. 10 is a flowchart describing an exemplary sender replay subroutine, which is utilized during step 3 of the progressive retry recovery algorithm of FIG. 7.

As previously indicated, the progressive retry recovery algorithm 700 will execute the sender replay subroutine 1000 during step 3 of the progressive retry method. The sender replay subroutine (step 3) 1000 will be entered at step 1001, as shown in FIG. 10. The sender replay subroutine (step 3) 1000 will initially discard during step 1010 all of the messages in the receiver log file 90 of the faulty process that were received by the faulty process since the last actual checkpoint. As discussed below, the senders of these discarded messages will then resend these messages to the faulty process in an attempt to bypass the fault in the faulty process.

The watchdog 15 associated with the faulty process will then transmit a request during step 1020 to the central recovery coordinator 75 to recompute the recovery line 310 for a step 3 recovery with an indication of the faulty process. The manner in which the central recovery coordinator 75 will process the request and recompute the recovery line is discussed below in conjunction with FIGS. 15a and 15b.

Once the central recovery coordinator 75 has recomputed the recovery line, it will broadcast the recomputed recovery line information to each monitored application process. Upon receipt of the recomputed recovery line, each monitored process will process the recovery line, substantially in parallel, and determine the appropriate response, as shown by the processing branches 1030 and 1040 in FIG. 10, for the processes $P_0$ and $P_N$, respectively.

The process $P_0$ will receive the broadcasted recovery line 310 from the central recovery coordinator 75 during step 1050. Thereafter, the process message log subroutine 1300, discussed below in conjunction with FIG. 13, is executed for process $P_0$ during step 1060. Using the process message log subroutine 1300, the senders of the discarded messages can resend those messages for receipt by the faulty process in a potentially different order, which may serve to bypass the fault.

Figure 6D:
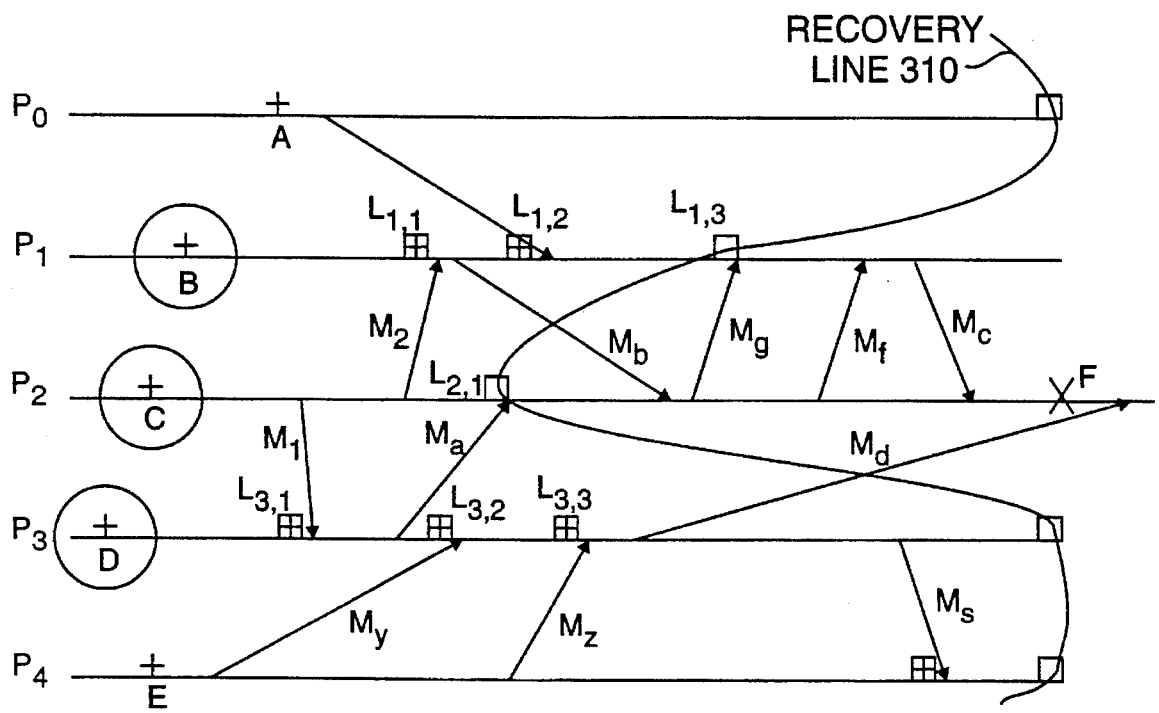

As shown in FIG. 6d, when a fault is detected for process $P_2$, by the error detection monitor 20 of the watchdog 15, at the point marked "F", the restart subsystem 30 of the watchdog 15 will initiate the progressive retry recovery algorithm 700 to attempt to bypass the fault. During step 3 retry, the process message log subroutine 1300 will cause the senders of the discarded messages to resend those messages.

As discussed below, the process message log subroutine 1300 will execute the deterministic replay subroutine 1400 to replay the deterministic messages. The deterministic replay subroutine 1400 will evaluate each of the messages that are generated by the process $P_2$ during deterministic replay to verify that the piecewise deterministic assumption is valid. If a message regenerated during recovery does not equal the message that was stored in the sender log file 92 during initial processing, a nondeterministic event must have occurred.

Figure 6E:
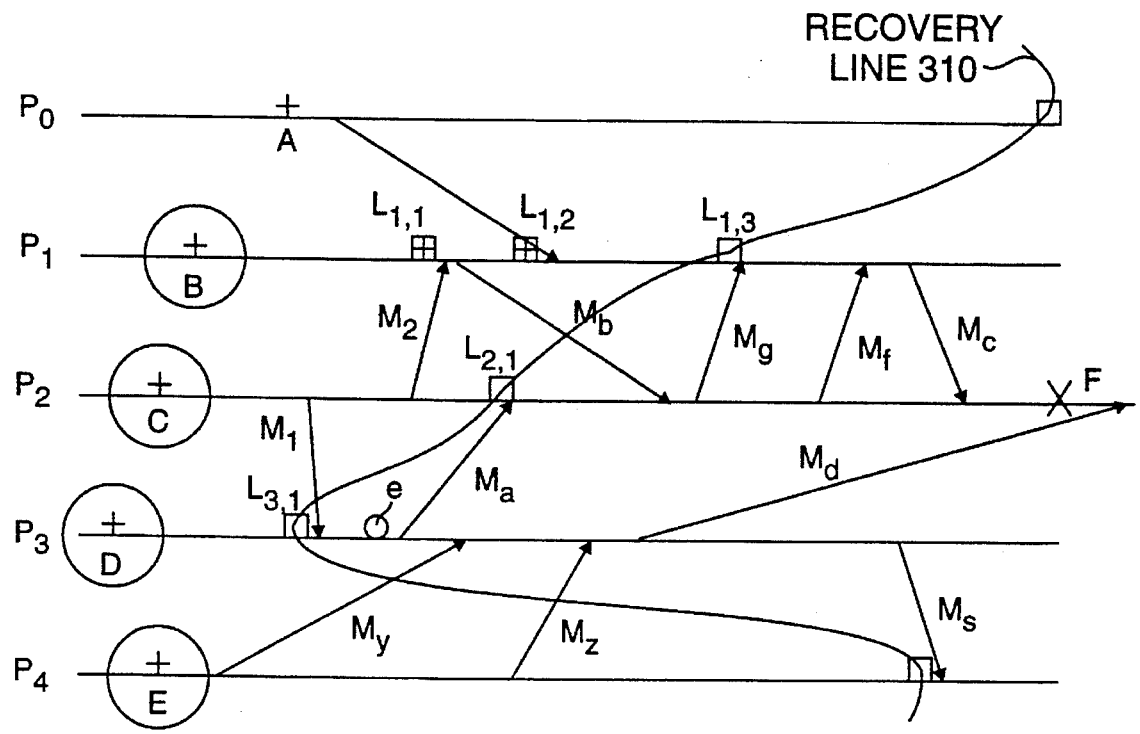

For example, as shown in FIG. 6e, the deterministic replay subroutine 1400 will replay each of the messages in $P_3$'s message logs up to message $M_a$. Upon regeneration of message $M_a$, the deterministic replay subroutine 1400 will determine, in a manner described below, that a nondeterministic event, e, has occurred which makes the previous version of message $M_a$ that was generated no longer valid. Thus, process $P_3$ can only reconstruct its state up to the logical checkpoint $L_{3,1}$ which is immediately before the nondeterministic event, e, and all the logical checkpoints beyond the nondeterministic event become unavailable and must be discarded. Accordingly, process $P_3$ must roll back to logical checkpoint $L_{3,1}$ and unsend messages $M_a$, $M_d$ and $M_s$ and thus involve process $P_4$ in the recovery, as shown by the new recovery line 310 in FIG. 6e.

As shown in FIG. 10, the process $P_N$ will receive and process the broadcasted recovery line 310 during steps 1070 and 1080, which will be processed by the process $P_N$ substantially in parallel with the processing of process $P_0$ and all other monitored processes.

After all of the monitored processes have completed processing of the recomputed recovery line 310, program control will return during step 1090 to the progressive retry recovery algorithm 700 and normal execution will resume for each monitored process, $P_0$ through $P_N$. If the previously detected fault is bypassed, program control will continue. If not, error detection monitor 20 will detect the fault again and will reinitiate the progressive retry recovery algorithm 700 this time trying step 4.

STEP 4—SENDER REORDER

Figure 11:
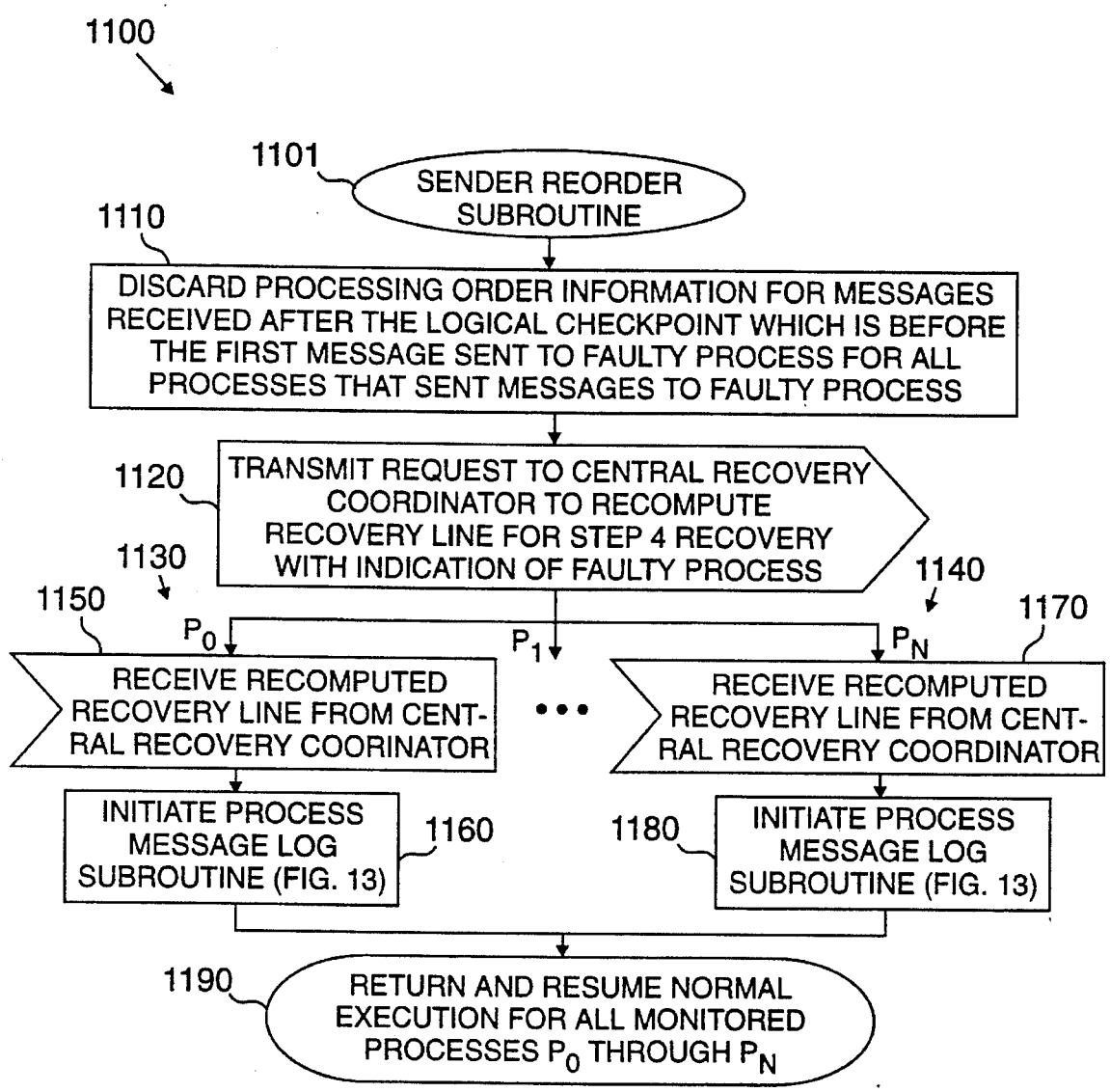
FIG. 11 is a flowchart describing an exemplary sender reorder subroutine, which is utilized during step 4 of the progressive retry recovery algorithm of FIG. 7.

As previously indicated, the progressive retry recovery algorithm 700 will execute the sender reorder subroutine 1100 during step 4 of the progressive retry method. The sender reorder subroutine (step 4) 1100 will be entered at step 1101, as shown in FIG. 11. During step 4 retry, the progressive retry recovery algorithm 700 will increase the scope of the recovery and the degree of nondeterminism by involving the processes which have sent messages to the faulty process in the recovery and having them reorder the in-transit messages in their receiver log file 90 before reprocessing them. During the reprocessing of the reordered in-transit messages, the processes which have previously sent messages to the faulty process may again send messages to the faulty process.

The watchdog 15 associated with the faulty process will initially discard the processing order information during step 1110 for each of the messages in the receiver log file 90 after the logical checkpoint which is before the first message sent to the faulty process for all processes that sent messages to the faulty process since the latest actual checkpoint. This will serve to invalidate all of the logical checkpoints after the first message sent to the faulty process since the last actual checkpoint for all processes that sent messages to the faulty process.

Thereafter, the watchdog 15 associated with the faulty process will transmit a request during step 1120 to the central recovery coordinator 75 to recompute the recovery line 310 for a step 4 recovery with an indication of the faulty process. The manner in which the central recovery coordinator 75 will process the request and recompute the recovery line is discussed below in conjunction with FIGS. 15a and 15b. Generally, during a step 4 recovery, the central recovery coordinator 75 will discard all of the logical checkpoints after the first message that was sent to the faulty process for each of the processes that have sent messages to the faulty process.

Once the central recovery coordinator 75 has recomputed the recovery line, it will broadcast the recomputed recovery line information to each monitored application process. Upon receipt of the recomputed recovery line, each monitored process will process the recovery line, substantially in parallel, and determine the appropriate response, as shown by the processing branches 1130 and 1140 in FIG. 11, for the processes $P_0$ and $P_N$, respectively.

The process $P_0$ will receive the broadcasted recovery line 310 from the central recovery coordinator 75 during step 1150. Thereafter, the process message log subroutine 1300, discussed below in conjunction with FIG. 13, is executed for process $P_0$ during step 1160.

Figure 6F:
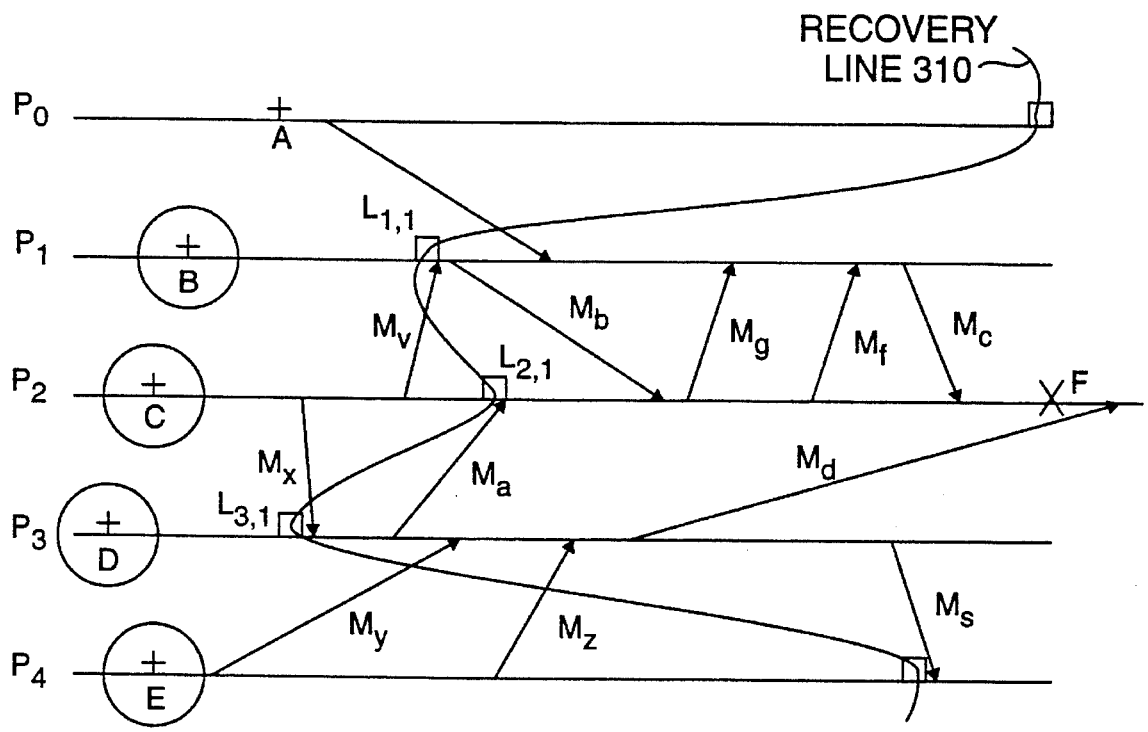

As shown in FIG. 6f, all of the logical checkpoints after the first message that was sent to the faulty process for the processes which have sent messages to the faulty process, $P_2$, have been discarded. Thus, process $P_1$ must logically roll back to logical checkpoint $L_{1,1}$ and process $P_2$ must logically roll back to logical checkpoint $L_{3,1}$. Since process $P_2$ must unsend message $M_s$, process $P_4$ must participate in the roll back.

As shown in FIG. 11, the process $P_N$ will receive and process the broadcasted recovery line 310 during steps 1170 and 1180, which will be processed by the process $P_N$ substantially in parallel with the processing of process $P_0$ and all other monitored processes.

After all of the monitored processes have completed processing of the recomputed recovery line 310, program control will return during step 1190 to the progressive retry recovery algorithm 700 and normal execution will resume for each monitored process, $P_0$ through $P_2$. If the previously detected fault is bypassed, program control will continue. If not, error detection monit, or 20 will detect the fault again and will reinitiate the progressive retry recovery algorithm 700 this time trying step 5.

STEP 5—LARGE SCOPE ROLL BACK

When all localized retries performed during steps 1 through 4 of the progressive retry recovery algorithm 700 fail to bypass the software fault or faults, the progressive retry recovery algorithm 700 will utilize the globally consistent set of checkpoints in order to implement a large-scope rollback.

Figure 12:
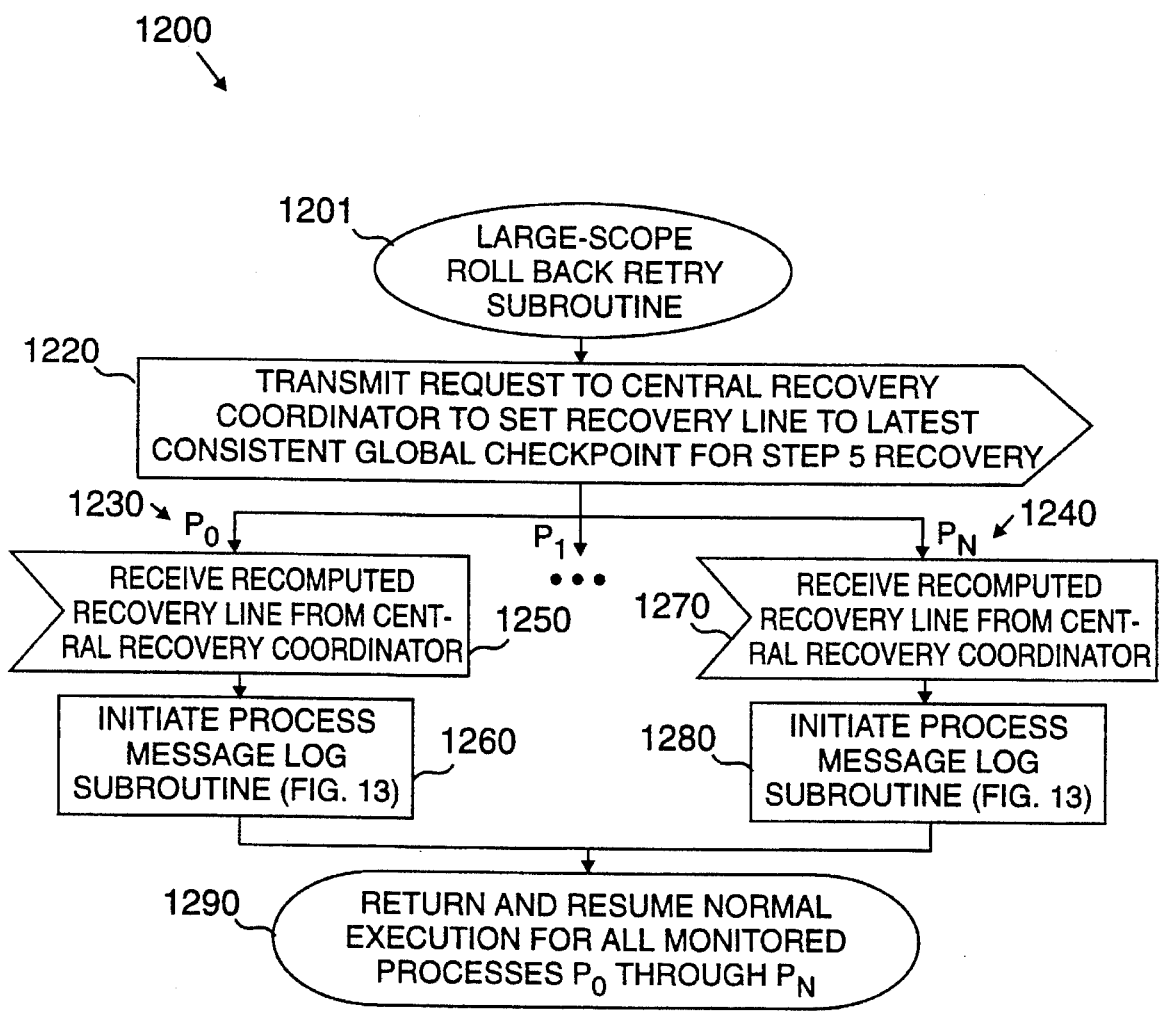
FIG. 12 is a flowchart describing an exemplary large-scope roll back retry subroutine, which is utilized during step 5 of the progressive retry recovery algorithm of FIG. 7.

As previously indicated, the progressive retry recovery algorithm 700 will execute the large-scope roll back retry subroutine 1200 during step 5 of the progressive retry method. The large-scope roll back retry subroutine (step 5) 1200 will be entered at step 1201, as shown in FIG. 12. The watchdog 15 associated with the faulty process will transmit a request during step 1220 to the central recovery coordinator 75 to recompute the recovery line 310 for a step 5 recovery. The manner in which the central recovery coordinator 75 will process the request and recompute the recovery line is discussed below in conjunction with FIGS. 15a and 15b.

Once the central recovery coordinator 75 has recomputed the recovery line, it will broadcast the recomputed recovery line information to each monitored application process. Upon receipt of the recomputed recovery line, each monitored process will process the recovery line, substantially in parallel, and determine the appropriate response, as shown by the processing branches 1230 and 1240 in FIG. 12, for the processes $P_0$ and $P_N$, respectively.

The process $P_0$ will receive the broadcasted recovery line 310 from the central recovery coordinator 75 during step 1250. Thereafter, the process message log subroutine 1300, discussed below in conjunction with FIG. 13, is executed for process $P_0$ during step 1260.

Similarly, the process $P_N$ will receive and process the broadcasted recovery line 310 during steps 1270 and 1280, which will be processed by the process $P_N$ substantially in parallel with the processing of process $P_0$ and all other monitored processes.

After all of the monitored processes have completed processing of the recomputed recovery line 310, program control will return during step 1290 to the progressive retry recovery algorithm 700 and normal execution will resume for each monitored process, $P_0$ through $P_N$. If the previously detected fault is bypassed, program control will continue. If the fault is not bypassed, the detection monitor 20 will detect the fault again and will reinitiate the progressive retry recovery algorithm 700 this time requiring a full restart of the system.

RECOVERY REPLAY SUBROUTINES

As previously indicated, the process message log subroutine 1300 will be executed for one or more processes during each step of the progressive retry recovery algorithm 700. The process message log subroutine 1300 will classify all of the messages in the receiver log file 90 of the associated process, based on the recomputed recovery line. Thereafter, the process message log subroutine 1300 will initiate the replay of the deterministic messages and resend the in-transit messages. In addition, the process message log subroutine 1300 will reorder the in-transit messages for the faulty process in a step 2 retry and for all processes that sent messages to the faulty process for a step 4 retry. It is noted that the process message log subroutine 1300 may be separately executed substantially in parallel by a number of different application processes.

The process message log subroutine 1300 will be entered by a given process at step 1301. A test is performed during step 1310 to determine if the current process state of the application process executing the process message log subroutine 1300 is at the recovery line. If it is determined during step 1310 that the current process state of the application process executing the process message log subroutine 1300 is already at the recovery line, then the application process does not need to perform any processing for state reconstruction. Thus, program control will return during step 1380 to the calling function.

If, however, it is determined during step 1310 that the current process state of the application process executing the process message log subroutine 1300 is not at the recovery line, then all of the messages in the receiver log file 90 of the associated application process are classified as deterministic, in-transit or orphan, as defined above in conjunction with FIG. 3.

All of the orphan messages for the application process executing the process message log subroutine 1300, which are no longer valid because they were sent after the recovery line, are discarded during step 1330.

Figure 14A:
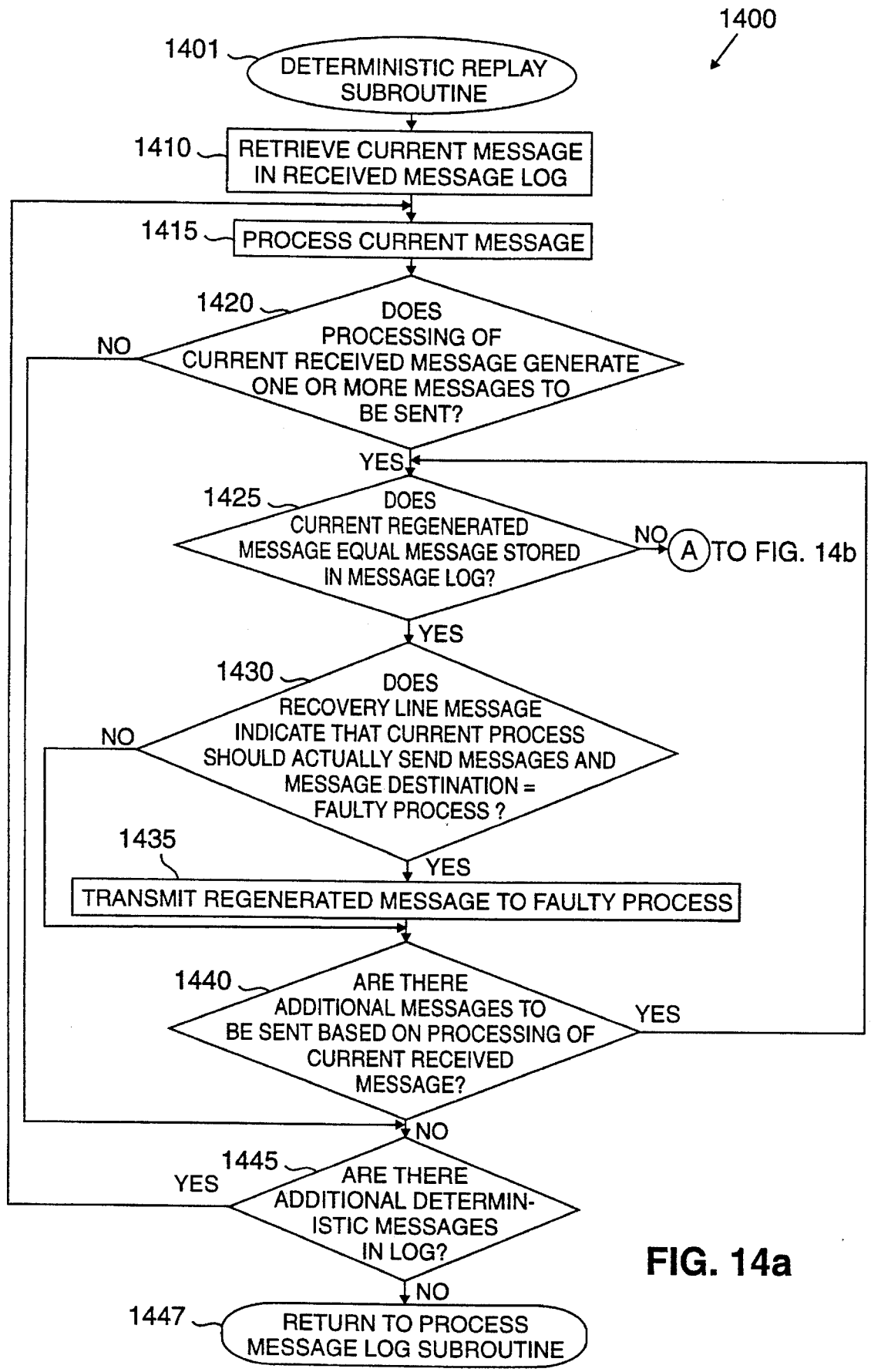
FIGS. 14a and 14b, collectively, are a flowchart describing an exemplary deterministic replay subroutine, which is utilized by the process message log subroutine of FIG. 13 during recovery to deterministically replay the messages in the message logs of FIGS. 5a and 5b.
Figure 14B:
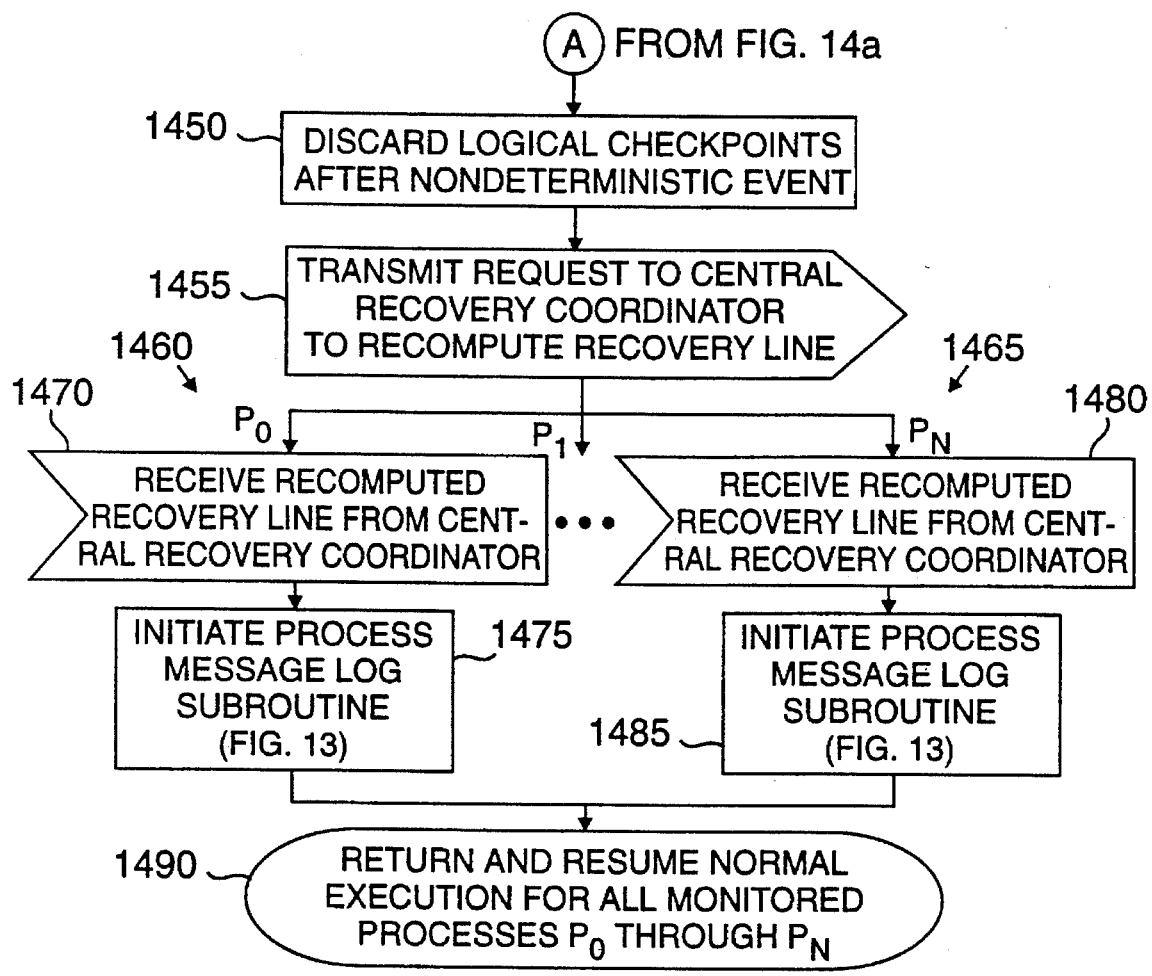

Thereafter, the application process will roll back to its latest actual checkpoint during step 1340 and then initiate the deterministic replay subroutine 1400, discussed below in conjunction with FIGS. 14a and 14b, to replay the deterministic messages for the application process up to the recovery line. A test is then performed during step 1350 to determine if the message included with the recomputed recovery line indicates that the current application process should reorder its in-transit messages. It is noted that for step 2 retry, the faulty process will reorder its messages, and for step 4 retry the processes which sent messages to the faulty process will reorder their messages. In a preferred embodiment, the central recovery coordinator 75 will transmit a message vector with the recomputed recovery line, as discussed below in conjunction with FIGS. 15a and 15b. The message vector will have a field for each monitored process. If a particular process should reorder its in-transit messages, the respective field in the message vector is preferably set to a binary value of "01".

In a preferred embodiment, a plurality of options are provided for reordering the in-transit messages during step 2 and step 4 retries. A default reordering option will preferably reorder the in-transit messages with different reference identifiers in a random manner, but will preferably maintain the order of messages from the same sender having the same reference identifier. Thus, by specifying a reference identifier when a message is sent, message dependency can be enforced, if necessary. Alternative reorder options can group messages from the same processes together, can execute messages requesting the freeing of resources before messages requesting the allocation of resources are executed and can reverse the order when there are only two messages in the message log.

If it is determined during step 1350 that the current application process should reorder its in-transit messages, then the messages will be appropriately reordered before replaying and reprocessing them during step 1370. If, however, it is determined during step 1350 that the current application process should not reorder its in-transit messages, then the messages will simply be resubmitted to the communication channel during step 1360 for transmission to the appropriate application process. Thereafter, program control will proceed to step 1380, where control will return to the calling function.

As previously indicated, the deterministic replay subroutine 1400 will be executed during step 1340 of the process message log subroutine 1300 after the application process is rolled back to its latest actual checkpoint. The deterministic replay subroutine 1400 will deterministically replay all of the deterministic messages in the receiver log file 90 of an application process, and thereby facilitate state reconstruction. In addition, the deterministic replay subroutine 1400 preferably includes a mechanism for verifying the piecewise deterministic assumption, as discussed below.

The deterministic replay subroutine 1400 will be entered at step 1401. Thereafter, the deterministic replay subroutine

1400 will retrieve the current message from the receiver log file 90 of the current application process during step 1410, and then process the retrieved message during step 1415.

A test is performed during step 1420 to determine if the processing of the current retrieved message by the application process generates one or more messages to be sent. If it is determined during step 1420 that the processing of the current retrieved message by the application process does not generate any messages to be sent, then program control will proceed to step 1445, discussed below.

If, however, it is determined during step 1420 that the processing of the current retrieved message by the application process does generate at least one message to be sent, then a test is performed during step 1425 to verify the piecewise deterministic assumption by verifying that the message regenerated during the current step of the recovery is identical to the message stored in the sender log file 92 during the initial execution.

If it is determined during step 1425 that the regenerated message is identical to the message stored in the sender log file 92, then a test is performed during step 1430 to determine if the message included with the recomputed recovery line indicates that the current application process should actually send the regenerated messages if the regenerated message is destined for the faulty process. It is noted that processes which have sent messages to the faulty process will resend those messages during step 3 retry. In a preferred embodiment, the central recovery coordinator 75 will transmit a message vector with the recomputed recovery line, as discussed below in conjunction with FIGS. 15a and 15b. The message vector will have a field for each monitored process. If a particular process should resend messages to the faulty process during step 3 retry, the respective field in the message vector is preferably set to a binary value of "10".

If it is determined during step 1430 that the message included with the recomputed recovery line does not indicate that the current application process should actually send the regenerated messages, then program control will proceed to step 1440, discussed below, without transmitting the message. If, however, it is determined during step 1430 that the message included with the recomputed recovery line indicates that the current application process should actually send the regenerated messages, and the regenerated message is destined for the faulty process, then the message is transmitted to the faulty process during step 1435.

A test is performed during step 1440 to determine if there are additional messages to be sent based on the processing of the current received message. If it is determined during step 1440 that there are additional messages to be sent based on the processing of the current received message, then program control will return to step 1425, and continue in the manner described above.

If, however, it is determined during step 1440 that there are no additional messages to be sent based on the processing of the current received message, then program control will proceed to step 1445.

A test is performed during step 1445 to determine if there are additional deterministic messages to be processed in the receiver log file 90. If it is determined during step 1445 that there are additional deterministic messages to be processed in the receiver log file 90, then program control will return to step 1415 and continue in the manner described above.

If, however, it is determined during step 1445 that there are no additional deterministic messages to be processed in the receiver log file 90, then program control will return to the process message log subroutine 1300 during step 1447.

If, however, it was determined during step 1425 that the regenerated message is not identical to the message stored in the sender log file 92, then a nondeterministic event has occurred and the piecewise deterministic assumption cannot be followed. Thus, all of the logical checkpoints for the current application process are discarded during step 1450 (FIG. 14b) after the nondeterministic event.

The watchdog 15 associated with the current application process will then transmit a request during step 1455 to the central recovery coordinator 75 to recompute the recovery line 310. The manner in which the central recovery coordinator 75 will process the request and recompute the recovery line is discussed below in conjunction with FIGS. 15a and 15b.

Once the central recovery coordinator 75 has recomputed the recovery line, it will broadcast the recomputed recovery line information to each monitored application process. Upon receipt of the recomputed recovery line, each monitored process will process the recovery line, substantially in parallel, and determine the appropriate response, as shown by the processing branches 1460 and 1465 in FIG. 14b, for the processes $P_0$ and $P_N$, respectively.

The process $P_0$ will receive the broadcasted recovery line 310 from the central recovery coordinator 75 during step 1470. Thereafter, the process message log subroutine 1300, discussed above in conjunction with FIG. 13, is reexecuted for process $P_0$ during step 1475. Similarly, the process $P_N$ will receive and process the broadcasted recovery line 310 during steps 1480 and 1485, which will be processed by the process $P_N$ substantially in parallel with the processing of process $P_0$ and all other monitored processes.

After all of the monitored processes have completed processing of the recomputed recovery line 310, program control will return during step 1490 to the progressive retry recovery algorithm 700 and normal execution will resume for each monitored process, $P_0$ through $P_N$. If the previously detected fault is bypassed, program control will continue. If the fault is not bypassed, the error detection monitor 20 will detect the fault again and will reinitiate the progressive retry recovery algorithm 700.

RECOVERY LINE COMPUTATION

As previously indicated, the watchdog 15 monitoring the faulty process will transmit requests to the central recovery coordinator 75 during each of steps 2 through 5 of the progressive retry recovery algorithm 700 to recompute the recovery line. The central recovery coordinator 75 will process these requests by executing the recovery line computation algorithm 1500, shown in FIGS. 15a and 15b. The recovery line computation algorithm 1500 will be entered at step 1505, upon receipt of a request for a recovery line computation. As previously indicated, the recovery line computation requests will include an indication of the current step of the progressive retry recovery algorithm 700 and an indication of the faulty process.

Thereafter, the recovery line computation algorithm 1500 will reset a message vector during step 1510 which will be broadcast with the recomputed recovery line. It is noted that in a preferred embodiment, the message vector will include a field for transmitting a message to each monitored application process. A binary message value of 00 preferably indicates that the associated application process is in a normal mode. A binary message value of 01 preferably indicates that the associated application process should reorder the messages in its receiver log file 90 before they are replayed and reprocessed. Finally, a binary message value of 10 preferably indicates that the associated application process should actually resend messages to the faulty application process during step 3 retry.

A test is performed during step 1515 to determine if the value of the counter variable, N, which is controlled by the progressive retry recovery algorithm 700 and determines the current step number, is equal to two. If it is determined during step 1515 that the value of the counter variable, N, is equal to two, this is the first time the central recovery coordinator 75 is recomputing the recovery line to recover from the current fault. It is noted that the central recovery coordinator 75 is not involved in step 1 recovery.

Thus, the central recovery coordinator 75 will broadcast a message during step 1520 to all of the monitored application processes requesting the dependency information for all messages in their receiver log file 90. The central recovery coordinator 75 will receive the transmitted dependency information from each monitored process during step 1525.

It is noted that the faulty process discarded the processing order information for the messages in its receiver log file 90 after the last actual checkpoint during execution of the receiver reorder subroutine (step 2) 900, which serves to invalidate the logical checkpoints after the first received message. Accordingly, the recovery line computation algorithm 1500 should remove during step 1528 the logical checkpoints for the faulty process from the dependency information after the first message received by the faulty process since its last actual checkpoint.

During step 2 retry, only the faulty process should reorder messages in its receiver log file 90. Accordingly, the recovery line computation algorithm 1500 will set the message vector field during step 1530 for the faulty process to the binary value "01", indicating that the faulty process should reorder the in-transit messages in its receiver log file 90 before replaying and reprocessing them. Thereafter, program control will proceed to step 1570 (FIG. 15*b*).

If, however, it was determined during step 1515 that the value of the counter variable, N, does not equal two, a test is performed during step 1535 to determine if the value of the counter variable, N, is equal to three. It is noted that for step 3 retry, the recovery line computation algorithm 1500 will construct the same recovery line that was determined for step 2 retry, although the message vector will be modified. If it is determined during step 1535 that the value of the counter variable, N, is equal to three, then the recovery line computation algorithm 1500 will set the message vector field during step 1540 for all monitored application processes that sent messages to the faulty process to the binary value "10", indicating that these processes should actually resend the deterministic messages in their receiver log file 90. Thereafter, program control will proceed to step 1570 (FIG. 15*b*).

If, however, it was determined during step 1535 that the value of the counter variable, N, does not equal three, a test is performed during step 1545 to determine if the value of the counter variable, N, is equal to four. If it is determined during step 1545 that the value of the counter variable, N, is equal to four, then the recovery line computation algorithm 1500 will remove all of the logical checkpoints after the first message sent to the faulty process from the communication graph, discussed below, during step 1550 for all processes that sent messages to the faulty process.

Thereafter, the recovery line computation algorithm 1500 will set the message vector field during step 1555 for all monitored application processes that sent messages to the faulty process to the binary value "01", indicating that these processes should reorder the in-transit messages in their receiver log file 90 before replaying and reprocessing them. Thereafter, program control will proceed to step 1570 (FIG. 15*b*).

If, however, it was determined during step 1545 that the value of the counter variable, N, does not equal four, a test is performed during step 1560 (FIG. 15*b*) to determine if the value of the counter variable, N, is equal to five. If it is determined during step 1560 that the value of the counter variable, N, is equal to five, then the recovery line computation algorithm 1500 will discard all of the logical checkpoints during step 1565 for all monitored processes in order to initiate a large scope roll back of all monitored processes to their latest consistent global checkpoint. Thereafter, program control will proceed to step 1570 (FIG. 15*b*).

Once program control has reached step 1570 (FIG. 15*b*), the recovery line computation algorithm 1500 has already collected the dependency information during its first execution for step 2 retry, and has modified the dependency information, if appropriate, during steps 1550 and 1565, for step 4 and step 5 retry. The recovery line computation algorithm 1500 will construct a communication graph during step 1570 using the dependency information, as modified, if appropriate, and then utilize the roll back propagation algorithm and the constructed communication graph during step 1580 to recompute the recovery line. For a discussion of a suitable method for constructing a communication graph and for applying the roll back propagation algorithm for computing the recovery line, see Yi-Min Wang and W. Kent Fuchs, "Lazy Checkpoint Coordination for Bounding Rollback Propagation," Proc. IEEE Symposium Reliable Distributed Systems, pp. 78–85 (October 1993), incorporated herein by reference.

Thereafter, the recovery line computation algorithm 1500 will broadcast the recomputed recovery line, together with the message vector, to all monitored application processes, for processing in the manner described above.

BYPASSING FAULT BY MESSAGE REORDERING

When information can be obtained regarding the nature of a particular fault, it may be appropriate to proceed directly to the reordering steps of the progressive retry recovery algorithm 700. It is noted that the replaying steps of the progressive retry recovery algorithm 700, namely steps 1 and 3, are suitable for bypassing software faults in application processes having nondeterministic behavior. The replaying steps will not be suitable for bypassing faults, however, in application processes exhibiting deterministic behavior, in other words, application processes that will behave in the same manner given the same inputs. Accordingly, for a particular application process that is known to exhibit deterministic behavior, the recovery should proceed directly to the reordering steps, namely steps 2 and 4.

In one embodiment, the fault tolerant library 82 can include a function which, when invoked by an application process, will set a nondeterministic bit indicating that the process includes some nondeterministic behavior, such as a time dependent event, a system call failure, or a signal interrupt. Accordingly, upon detection of a fault in the application process by the error detection monitor 20, the restart subsystem 30 can evaluate the value of the nondeterministic bit to determine if the bit has been set by the application process. If the bit has been set, the recovery should begin with a step 1 retry. If the bit has not been set, however, the recovery should proceed directly to the reordering steps, which will serve to reorder the sequence of the inputs received by the faulty process. It is noted that the sequenced inputs received by the faulty process may be messages, files, events, operations or other data.

In addition, a recovery from software faults that are known to be the result of resource allocation problems, such as a depletion of resources, should also proceed directly to step 2 reordering. For example, if a system has only two file descriptors, and the system receives three consecutive requests to open files, without any intervening requests to close a file, the system will exhaust the file descriptors, leading to a resource allocation problem. If, however, the system were to reorder the sequence of its inputs, some requests to close files may be processed before the third request to open a file, thereby bypassing the software fault.

Furthermore, a recovery from software faults that are known to be the result of racing bugs, where the process assumes that inputs will arrive in a particular order, but they actually arrive in a different order, should also proceed to step 2 reordering. In this manner, when the sequence of inputs are reordered, they may assume the appropriate order and thereby bypass the software fault.

ILLUSTRATIVE EXAMPLES

Step 1 Retry Illustration

If a system includes several processes accessing shared data structures, and the locking mechanism to ensure mutually exclusive access includes a bug, or is not present in the system, there is a possibility that one process may attempt to read a data structure while another process is updating the data structure, for example, manipulating the pointers in order to insert a new data node. In such a case, the reading process will receive a segmentation violation fault which will be detected by the watchdog 15, which will then initiate a recovery. Once the reading process is restarted and replays the request message for accessing the same data structure again during a step 1 retry, the read operation succeeds because the process updating the data structure has likely finished the update.

It is noted that although this type of fault could be avoided by providing a locking mechanism to guarantee mutually exclusive access, a coarse-grain lock results in unnecessary blocking of the reader processes, and a fine-grain lock can incur large performance degradation and introduce additional software complexity. Thus, the message replaying of step 1 of the progressive retry method provides a reliable and efficient alternative to the locking mechanism for dealing with the concurrency problem.

Step 2 Retry Illustration

A file system for maintaining files will often utilize three main operations: open a file, write to a file and close a file. Since the number of file descriptors that may be utilized to identify a file is limited, the file system could run out of file descriptors. Accordingly, the file system has to keep track of how many files are currently open. A boundary condition will occur when all of the file descriptors are utilized. If the resource manager that handles the boundary condition has a bug, the file system will hang up each time the boundary condition occurs.

The following example illustrates how Step-2 message reordering can bypass the boundary condition in the file system, where the command $O_1$ stands for opening file 1, the command $W_1$ stands for writing data to file 1 and the command $C_1$ stands for closing file 1 and the file system can have at most 2 open files at the same time. If the file system receives the following command sequence, $$O_1\ O_2\ W_1\ W_2\ O_3\ W_3\ C_1\ C_2$$

then the file system will enter the boundary condition when processing $O_3$ and hang up. The software fault will be detected by the watchdog 15, which will initiate a restart of the faulty process.

It is noted that this fault will not be bypassed by a step 1 retry, because when the messages are replayed from the receiver log file 90 in the same order, the boundary condition will still occur. Thus, the progressive retry recovery algorithm 700 will proceed to a step 2 retry. The message sequence may be reordered during a step 2 retry as follows:

$$O_1\ W_1\ C_1\ O_2\ W_2\ C_2\ O_3\ W_3.$$

When these reordered messages are then replayed and reprocessed by the faulty process, the boundary condition will not occur and the software fault will be bypassed.

Step 3 Retry Illustration

In a cross-connection system, a Channel Control Monitor (CCM) process is utilized to keep track of the available channels in a telecommunications switch. The CCM process receives messages from two other processes: a Channel Allocation (CA) process which sends the channel allocation requests and a Channel Deallocation (CD) process which sends the channel deallocation requests. A boundary condition for the CCM process occurs when all channels are used and the process receives additional allocation requests. When the boundary condition occurs, a clean-up procedure is called to free up some channels or to block further requests. If the clean-up procedure contains a software fault, however, the clean-up procedure may crash when the bug is triggered.

The following example illustrates how step-3 message replaying can be utilized to bypass the fault, where the number of available channels is 5, the command $r_2$ stands for requesting two channels, and the command $f_2$ stands for freeing two channels. Due to the boundary condition, the following command sequence could cause the CCM process to crash:

| CA sends | $r_2$ | $r_3$ | $r_1$ |
| --- | --- | --- | --- |
| CD sends | $f_2$ | $f_3$ | $f_1$ |
| CCM receives | $r_2$ | $r_3$ | $r_1$ |

Thus, the CCM process will crash upon receipt of the $r_1$ command, which will cause the boundary condition to occur. If, however, the CCM process were to receive and log the message $f_2$ before the crash, the CCM process will be able to recover by reordering the message logs. However, if the CCM process crashes before the $f_2$ command is logged, reordering messages $r_2$, $r_3$ and $r_1$ during a step 2 retry will not help. In this case, the local recovery of CCM fails and CA and CD will be requested to resend their messages (Step 3).

Due to the nondeterminism in operating system scheduling and transmission delay, the messages may arrive at the CCM process during step 3 message replay in a different order. For example, the CCM process may receive the messages in the following order:

$$r_2\ f_2\ r_3\ f_3 r_1\ f_1$$

which does not lead to the boundary condition, and hence the step 3 retry succeeds. Step 4 Retry Illustration We use the Signal Routing Points (SRPs) in a switching system as our fourth example. The responsibility of SRPs is to route data packets from the originating switch to the destination switch. Each SRP has a built-in overload control (OC) mechanism which sends out OC messages to other SRPs to reduce incoming traffic as a precaution when the number of packets in its buffer exceeds a threshold. Suppose in normal operation SRP-X can route data packets destined for a certain switch either through SRP-A or SRP-B. When SRP-X receives an OC message from SRP-A, it starts routing all such packets through SRP-B to avoid potential overload of SRP-A. But at the same time, the switch directly connected to SRP-B receives a sudden burst of service requests. These two kinds of traffic quickly fill the buffer of SRP-B and the process crashes before any overload control mechanism can be invoked, due to a software fault.

Local retries of SRP-B through message replaying and reordering during steps 1 through 3 cannot recover from the failure because they cannot bypass the overload condition. Step-3 retry involving SRP-X message replaying still leads to the same failure. SRP-X then initiates Step-4 retry by reordering the packets to be routed and the OC message from SRP-A. This effectively delays the processing of the OC message, and reduces the traffic through SRP-B to give SRP-B a chance to recover. The potential overload for SRP-A either never happens or it can be handled gracefully without causing a software failure.

It is to be understood that the embodiments and variations shown and described herein are illustrative of the principles of this invention only and that various modifications may be implemented by those skilled in the art without departing from the scope and spirit of the invention.

We claim:

1. A method for bypassing software faults in an application process, said fault bypass method comprising the steps of:

monitoring said application process for a software fault;

periodically performing a checkpoint of critical data associated with said application process to obtain one or more checkpoints, said checkpoints including a latest checkpoint;

logging inputs that are received and processed by said application process in an input log, said inputs being processed in a processing order, wherein said input log maintains an indication of the processing order in which said inputs were processed by said application process;

restoring said application process to said latest checkpoint upon detection of an error caused by a software fault during said monitoring step;

reordering the processing order of said inputs that were logged in said input log since said latest checkpoint, following said restoring step; and reprocessing said reordered inputs.

2. The fault bypass method according to claim 1, wherein said application process exhibits deterministic behavior.

3. The fault bypass method according to claim 1, wherein said detected fault results from an occurrence of a boundary condition.

4. The fault bypass method according to claim 3, wherein said inputs are reordered to process inputs requesting a deallocation of resources before processing inputs requesting an allocation of resources.

5. The fault bypass method according to claim 1, wherein said detected fault results from a racing condition.

6. The fault bypass method according to claim 5, wherein said inputs are reordered to process said inputs in the processing order in which they are expected by said process.

7. A method for bypassing software faults in an application process, said fault bypass method comprising the steps of:

monitoring said application process for a software fault;

periodically performing a checkpoint of critical data associated with said application process to obtain one or more checkpoints, said checkpoints including a latest checkpoint;

logging inputs that are received and processed by said application process in an input log, said inputs being processed in a processing order, wherein said input log maintains an indication of the processing order in which said inputs were processed by said application process;

identifying whether said application process exhibits nondeterministic behavior;

performing a progressive retry algorithm upon detection of a software fault during said monitoring step to recover said application process only if said identifying step indicates that said application process exhibits nondeterministic behavior, said application process with said detected fault being a faulty process; and performing a reorder recovery algorithm upon detection of a fault during said monitoring step to recover said application process if said identifying step does not indicate that said application process exhibits nondeterministic behavior, said reorder recovery algorithm comprising the steps of:

restoring said application process to said latest checkpoint upon detection of an error during said monitoring step;

reordering the processing order of said inputs that were logged in said input log since said latest checkpoint; and reprocessing said reordered inputs.

8. The fault bypass method according to claim 7, wherein said application process will set a flag if it exhibits nondeterministic behavior and said identifying step will evaluate said flag to determine whether said application process exhibits nondeterministic behavior.

9. The fault bypass method according to claim 7, wherein said progressive retry algorithm includes a plurality of retry steps, each of said retry steps having a recovery roll back of gradually increased scope when a previous retry step fails to bypass said detected fault.

10. The fault bypass method according to claim 7, wherein said application process receives one or more of said inputs from one or more sending processes, and wherein said progressive retry algorithm comprises the steps of:

performing a receiver replay step to restore said faulty process to said latest checkpoint associated with said process and to replay said inputs in said input log associated with said faulty process that were received by said faulty process since said latest checkpoint up to said point of said detected fault;

performing a receiver reorder step if said receiver replay step does not bypass said software fault, wherein at least two of said received inputs in said input log of said faulty process will be reordered before being replayed;

performing a sender replay step if said receiver reorder step does not bypass said software fault, wherein one or more of said inputs in said input log associated with said faulty process that were received by said faulty process after its latest checkpoint will be discarded and wherein each of said sending processes that sent said discarded inputs to said faulty process will resend messages to said faulty process during said sender replay step;

performing a sender reorder step if said sender replay step does not bypass said software fault, wherein each of said sending processes that sent inputs to said faulty process which were received by said faulty process since its latest checkpoint will reorder at least two of said inputs in its message log before replaying said inputs; and performing a large scope roll back step if said sender reorder step does not bypass said software fault, said large scope roll back step rolling back each of said monitored processes to the latest checkpoint associated with a consistent global checkpoint.

11. The fault bypass method according to claim 7, wherein said application process receives one or more of said inputs from another process, the receipt and logging of each input by said process associated with said log forms a logical checkpoint, said logical checkpoints having a latest logical checkpoint, said progressive retry algorithm employing a roll back propagation algorithm to compute a recovery line at the latest actual or logical checkpoint for each of said monitored processes which has not been discarded, said roll back propagation algorithm enforcing the roll back propagation rule, said inputs in said input logs that were received and processed by said associated processes between said latest actual checkpoint of said associated process and said computed recovery line being deterministic inputs, said inputs in said input logs that were sent before said computed recovery line and received after said recovery line being in-transit inputs, and wherein said progressive retry algorithm comprises the steps of:

performing a receiver replay step to restore said faulty process its latest checkpoint and to replay said inputs in said input log associated with said faulty process that were received by said faulty process since said latest checkpoint up to the point of the detected fault;

performing a receiver reorder step if said receiver replay step does not bypass said software fault, said receiver reorder step further comprising the steps of:

discarding said processing order information for said inputs in said input log associated with said faulty process that were received after its latest checkpoint;

computing said recovery line;

reordering said in-transit inputs in said input log of said faulty process; and replaying said deterministic inputs and replaying or resubmitting said in-transit inputs in said input logs of each of said monitored processes whose current process state is not at said recovery line;

performing a sender replay step if said receiver reorder step does not bypass said software fault, said sender replay step further comprising the steps of:

discarding said inputs in said input log associated with said faulty process that were received by said faulty process after the latest checkpoint performed for said faulty process; and replaying said deterministic inputs and resubmitting said in-transit inputs in said input logs of each of said monitored processes whose current process state is not at said recovery line, wherein each of said sending processes that sent said discarded inputs to said faulty process during initial processing will resend inputs to said faulty process during said sender replay step;

performing a sender reorder step if said sender replay step does not bypass said software fault, said sender reorder step further comprising the steps of:

discarding said processing order information for each of those inputs in said input logs associated with said sending process that were received by said sending process after the logical checkpoint which is before the first input sent by said sending process to said faulty process since the latest checkpoint associated with said faulty process;

recomputing said recovery line;

reordering said in-transit inputs in said input logs associated with said sending processes; and replaying said deterministic inputs and replaying or resubmitting said in-transit inputs in said input logs of each of said monitored processes whose current process state is not at said recovery line;

performing a large scope roll back step if said sender reorder step does not bypass said software fault, said large scope roll back step rolling back each of said monitored processes to the latest checkpoint associated with a consistent global checkpoint.

* * * * *